(12) United States Patent
Ramabaja

(10) Patent No.: US 10,803,022 B2
(45) Date of Patent: Oct. 13, 2020

(54) SYSTEMS AND METHODS OF PROVIDING IMMUTABLE RECORDS

(71) Applicant: ULedger, Inc., Boise, ID (US)

(72) Inventor: Taulant Ramabaja, Prishtina (XK)

(73) Assignee: Uledger, Inc., Boise, ID (US)

( * ) Notice: Subject to any disclaimer, the term of this patent is extended or adjusted under 35 U.S.C. 154(b) by 152 days.

(21) Appl. No.: 16/127,029

(22) Filed: Sep. 10, 2018

(65) Prior Publication Data

US 2019/0079950 A1    Mar. 14, 2019

Related U.S. Application Data

(60) Provisional application No. 62/556,212, filed on Sep. 8, 2017, provisional application No. 62/693,870, filed on Jul. 3, 2018.

(51) Int. Cl.
*H04L 29/06* (2006.01)
*G06F 16/18* (2019.01)
(Continued)

(52) U.S. Cl.
CPC ........ *G06F 16/1805* (2019.01); *H04L 9/0637* (2013.01); *H04L 9/0643* (2013.01);
(Continued)

(58) Field of Classification Search
CPC ... H04L 9/0637; H04L 9/0643; H04L 9/3236; H04L 9/3239; H04L 63/123; H04L 2209/38; G06F 16/1805
See application file for complete search history.

(56) References Cited

U.S. PATENT DOCUMENTS 9,774,578 B1 *  9/2017  Ateniese ................. G06F 21/53
9,785,369 B1 * 10/2017  Ateniese ............... G06F 3/0619
(Continued)

FOREIGN PATENT DOCUMENTS

WO    2017091530    6/2017
WO    2019051429    3/2019

OTHER PUBLICATIONS

International Search Report and Written Opinion dated Nov. 20, 2018 for international application PCT/US2018/050302.
(Continued)

*Primary Examiner* — Hosuk Song
(74) *Attorney, Agent, or Firm* — Stoel Rives LLP; R. Whitney Johnson

(57) ABSTRACT

Systems and methods of providing immutable records, and immutable ordering of records, in a computing system are disclosed. The computing system can be a member of a blockchain network of a plurality of blockchains. Each block can include a cryptographic digest (or hash) conforming to a minimum degree of difficulty, a nonce by which the cryptographic digest was generated in conformation with the degree of difficulty, and a list of cryptographic digests of most recent blocks of participating neighbor blockchains. Blocks may be passed between blockchains of the plurality of blockchains, which enables each member of the blockchain network to verify an immutable record of data transactions free of the mutual trust requirement of a typical blockchain environment. In conjunction with the generation of each block, an event record may be entered into an event log of the computing system wherein the block was generated. The event record, which may contain actionable instructions, requests, etc., may be transmitted to computing systems of participating neighbor blockchains, where actionable items may be acted upon. Further, the event logs of each computing system may be exchanged, compared, (Continued)

and adjusted to reflect the earliest appearance of each block of each participating neighbor blockchain.

26 Claims, 10 Drawing Sheets

(51) Int. Cl.
    *H04L 9/32*     (2006.01)
    *H04L 9/06*     (2006.01)

(52) U.S. Cl.
    CPC .......... *H04L 9/3236* (2013.01); *H04L 9/3239* (2013.01); *H04L 9/3247* (2013.01); *H04L 9/3263* (2013.01); *H04L 9/3297* (2013.01); *H04L 63/123* (2013.01); *H04L 2209/38* (2013.01); *H04L 2463/121* (2013.01)

(56) References Cited

U.S. PATENT DOCUMENTS

| | | | |
|---|---|---|---|
| 9,959,065 B2* | 5/2018 | Ateniese | H04L 9/3226 |
| 10,013,573 B2* | 7/2018 | Dillenberger | G06F 16/2379 |
| 10,326,802 B1* | 6/2019 | Irwan | H04L 9/3239 |
| 2017/0005804 A1 | 1/2017 | Zinder | |
| 2017/0195406 A1 | 7/2017 | Zhang et al. | |
| 2017/0243193 A1 | 8/2017 | Manian et al. | |
| 2020/0014542 A1 | 1/2020 | McIver et al. | |

OTHER PUBLICATIONS

"JRFC 20—Merkle DAG", Github, Jun. 20, 2014, https://github.com/jbenet/random-ideas/issues/20.

"Roughtime", https://roughtime.googlesource.com/roughtime, accessed Oct. 9, 2019.

Apostolaki, et al., "Hijacking Bitcoin: Routing Attacks on Cryptocurrencies", https://btc-hijack.ethz.ch/files/bts_hijack.pdf, accessed Oct. 9, 2019.

Back, et al., "Enabling Blockchain Innovations with Pegged Sidechains", https://blockstream.com/sidechains.pdf, Oct. 22, 2014.

Bag, et al., "Bitcoin Block Withholding Attack: Analysis and Mitigation", http://eiiixplire.ieee.org/document/7728010/, IEEE Xplore Digital Library, vol. 12, Issue 8, Aug. 2017, pp. 1967-1978.

Baquero, et al., "Why Logical Clocks are Easy-Sometimes All You Need is the Right Language", ACMQUEUE, Programming Languages, Apr. 12, 2016, vol. 14, Issue 1, http://queue.acm.org/detail.cfm?id=2917756.

Eyal, et al., "Majority is Not Enough: Bitcoin Mining is Vunerable", https://www.cs.cornell.edu/ie53/publications/btcProcFC.pdf, accessed Oct. 9, 2019.

Nakamoto, "Bitcoin: A Peer-to-Peer Electronic Cash System", https://bitcoin.org/bitcoin.pdf, accessed Oct. 9, 2019.

Sompolinsky, et al., "Secure High-Rate Transaction Processing in Bitcoin", https://eprin.iacr.org/2013/881.pdf.

* cited by examiner

SYSTEMS AND METHODS OF PROVIDING IMMUTABLE RECORDS

RELATED APPLICATIONS

This application claims priority to U.S. Provisional Patent Application No. 62/556,212, titled "Systems and methods of distributed dynamically changing state machines with provable ordering of events," filed Sep. 8, 2017, and to U.S. Provisional Patent Application No. 62/693,870, titled "DETECTION OF ANOMALIES IN A COMPUTER SYSTEM," filed Jul. 3, 2018, each of which is hereby incorporated herein by reference in its entirety.

TECHNICAL FIELD

The present disclosure relates generally to the field electronic ledgers for record keeping, such as distributed ledgers provided by blockchain, and more particularly to systems and methods of providing immutable records.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered limiting of the scope of the disclosure, the embodiments will be described and explained with specificity and detail in reference to the accompanying drawings.

DETAILED DESCRIPTION

Figure 1:
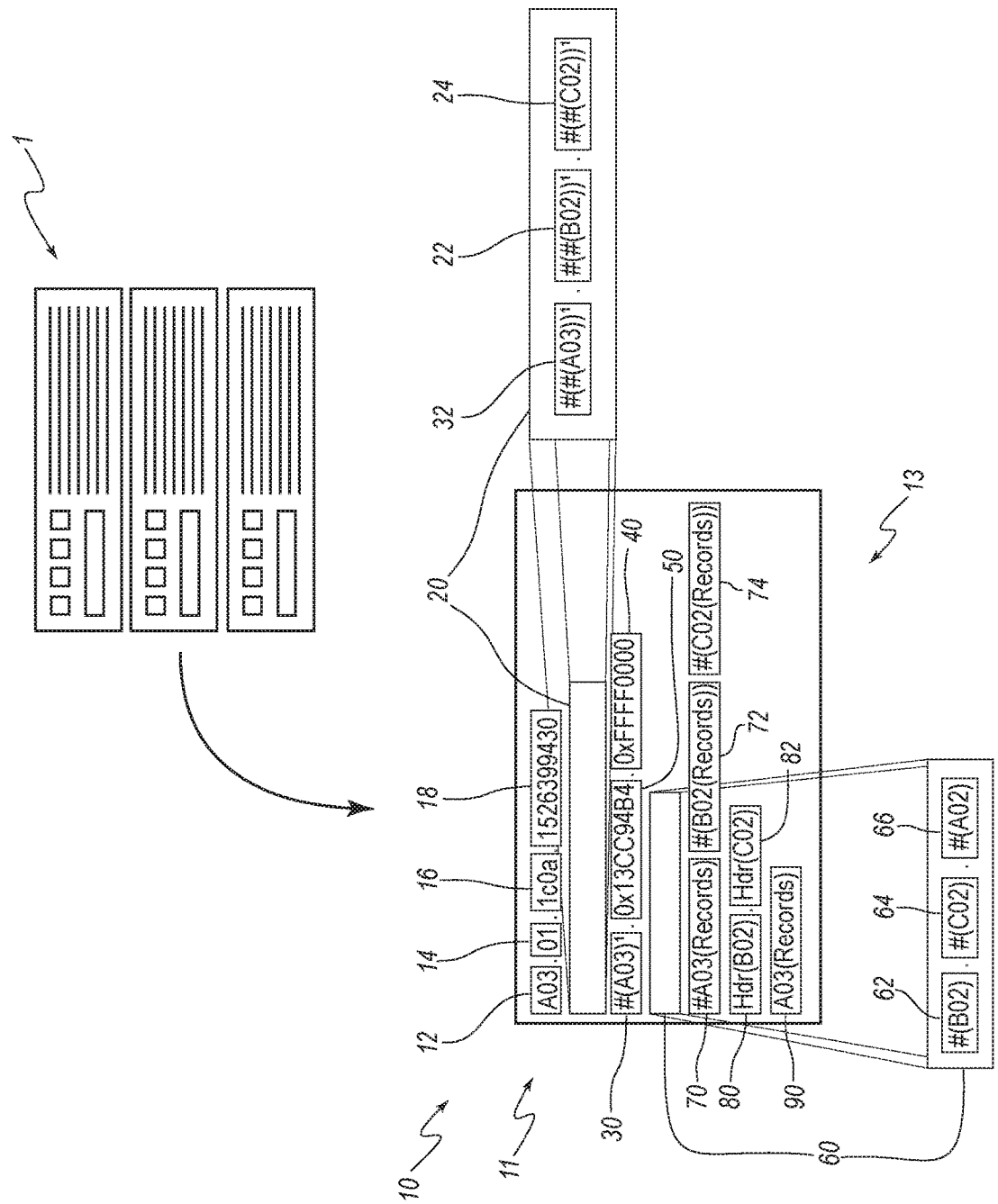
FIG. 1 is a diagram of a block of a blockchain within a computing system according to an embodiment of the present disclosure.

Transactional record keeping, a business practice central to business, requires at least accuracy, accessibility, security and reliability. Technological advances both respond to and drive these demands. Computer systems (hardware and software) can facilitate, to a degree, accurate, accessible, secure, reliable transactional record keeping. A number of aspects of computer-based transactional record keeping introduce both new advantages and weaknesses over older, traditional, pen-and-book record keeping.

The present disclosure is directed to systems and methods of providing immutable records. Embodiments of the present disclosure can include distributed dynamically changing state machines. The present disclosure may include systems and methods to provide provable ordering of events within and between such machines having interconnectivity/communication with one another. A dynamically changing state machine (e.g., a computing system) may, for example, be used for transactional record keeping. Transactional record keeping inherently demands reliable, provable accuracy, including the order in which events, transactional and otherwise, occurred and were recorded within the computing system. A hardware or software failure, or a malfeasor, may adversely impact the reliability and provability of the record keeping within the computing system. The present invention provides systems and methods of ensuring reliability and provability of record keeping for a plurality of computing systems intercommunicating particular transactional and timekeeping information.

Anomaly refers to a state change within a computer or computing system outside the expectations of the computer owner/operator—for example, without limitation, an actual or apparent timekeeping variance, or deviation in event order recording, as well as an actual defect in the integrity of data. (A defect in integrity of data does not necessarily require a defect in the data itself, but does create doubt as to the reliability and provability of the data.)

Computer refers to an electronic device that is capable of executing machine-readable instructions; that is suitable for storing and/or processing data; and that comprises at least a processor, a memory, an input capability, and an output capability. A computer may be a complete computing system, or a component of a computing system. A computer is capable of one or more of the computer functions of receiving data, processing data, storing data, transmitting data, and outputting data.

Computing system refers to a computer or a collection of computers and similar devices communicating together to accomplish one or more functions of a computer.

Network refers to a system or method and related equipment of interconnectivity between computing systems, regardless of topology, protocol, operating system, or geophysical location. In particular, network as used herein includes a multiplex network having multidirectional synchronous and asynchronous communication between nodes, wherein one node represents one computing system or particular collection of computing systems, and wherein one node may communicate with multiple other nodes simultaneously, and wherein multiple nodes may communicate simultaneously with multiple nodes.

Blockchain refers to a system or method wherein data are contained within a logical block, the various blocks of data are logically organized in a relative time-ordered sequence, and an element of the data of each block comprises a token identifying and logically connecting the block to the immediately preceding block.

Blockchain network refers to a collection of at least two blockchains which exchange with each other an amount of particular data whereby each blockchain in the blockchain network provides a degree of proof-of-truth and proof-ofwork for each other blockchain within the blockchain network. The particular data exchanged may comprise blockchain blocks. A blockchain network may be implemented through a form of one-way cryptography comprising cross-merkelization, as disclosed herein.

Principal blockchain generally refers to a blockchain operated by a principle; however, within the context of this disclosure, a principal blockchain is an example blockchain discussed herein as if the reader were the principle operating the example blockchain. Further, for the purposes of this disclosure, the example principal blockchain is participating in a blockchain network.

Participating neighbor blockchain refers to a blockchain participating in a blockchain network, exclusive of the principal blockchain but participating within the same blockchain network as the principal blockchain. Each of the blockchains, whether a principal blockchain or a participating neighbor blockchain, is a participating blockchain.

Block refers to a member unit of a blockchain, and further refers to a collection of data logically assembled together, and may include a variety of data of fixed types and sizes, and data of non-fixed types and sizes. In other words, a block may contain, for example without limitation, (1) a version identifier, (2) a block identifier, (3) a nonce, (4) a digest, (5) a parent digest, (6) a timestamp, and (7) transactional data. Items (1) through (6) may each have a particular data type and size, while item (7) may comprise a collection of data of varying types and/or lengths. Each block can contain a token (e.g., a parent hash), which identifies the immediately preceding block in the blockchain of which the block is a member.

Set refers to a partially ordered set, or poset, as discussed in the scholarly article Deshpande, Jayant V. (1968) "On Continuity of a Partial Order" *Proceedings of the American Mathematical Society,* 19 (2): 383-386. Doi:10.1-9-/50002-9939-1968-0236071-7, which is incorporated herein in its entirety by reference.

SHA refers to a Secure Hashing Algorithm. A SHA is a one-way cryptographic function or set of functions taking as input a string, which may be of variable length, and producing output of a fixed length. A purpose of a SHA is to produce an output string from which the input string cannot be derived. For purposes of this disclosure, references to SHA are directed toward a SHA-2 family implementation known as SHA256 according to (or complying with) a standard of the United States National Security Agency published in the Federal Information Processing Standards (FIPS) Pub. 180-4 by the National Institute of Standards and Technology (NIST). SHA256 is capable of taking an input string of variable length of up to over 1.844e19 characters (over 2,000,000 terabytes) and producing a 256-bit (32-byte) output string. In at least some SHA256 implementations, the input string can be (null) and produce an output string. The output string of SHA256 (or another SHA) is known as a digest. The term "hash" may be used interchangeably with digest. Other suitably secure cryptographic hashing algorithms may be used in some embodiments of the present disclosure.

A digest is an output from a secure hashing algorithm. With SHA256, the digest is 256 bits, or 32 bytes, in length. The digest, also known as a hash, has a fixed length of 256 bits; thus SHA256 may produce up to $2^{256}$ distinct digests (hashes). The representation of the digest may vary in length depending on the computing system encoding method. For example, a hexadecimal computing system may represent the digest as 32-character string.

Double-hash or double-hashing refers to "hashing a hash," or generating a digest and then using that digest as an input string, or portion of an input string, for another hash iteration to produce a new digest. For the second iteration, the digest output from the first iteration may be combined with another digest, for example, by concatenation, and the combination of the two digests forms an input for the second hash iteration. If another digest is not available, the first output digest may be duplicated with the original, and duplicate digests may be combined to form the input for the second hash iteration.

Merkelize or merkelizing (in some publications, "merklize" or "merklizing") refers to a process in which each of a collection of data strings is processed through a SHA, and each resulting digest is paired with another likewise-produced digest, for example by concatenation, and then processed through a SHA again to produce a new digest, with the procedure repeating until only a single digest remains. If at any iteration an odd number of digests exists (greater than one (1)), one of the digests is duplicated and the duplicate concatenated to its original, then processed through the SHA. The single remaining digest may be known as a merkle root for the particular collection of data strings. Similarly, merkelized refers to data having been processed by merkelization.

Cross-merkelization refers to merkelization wherein data, in the form of a digest, from one blockchain is merkelized with data, also in the form of a digest, of another blockchain. In a blockchain network, each participating blockchain contributes a digest relating the particular blockchain's latest block to each other participating blockchain, and each participating blockchain merkelizes together all digests received for the current block. Cross-merkelization is further detailed below.

System time refers to a time of a timekeeping subsystem of a computing system. A common practice is to configure the timekeeping subsystem of the computing system to periodically synchronize itself to a remote timekeeping system (such as a time server operated by the U.S. National Institute of Standards and Technology (NIST)).

Relative time refers to an ordering of events based on the apparent time the event occurred, or was perceived by or reported to the particular ordering mechanism without adherence to a strict time reference. For illustrative purposes, an Event A may occur within a computing system CS-A at 20180601:0101:10.150 UTC, an Event B may occur within a computing system CS-B 400 milliseconds after Event A relative to UTC, and an Event C may occur within a computing system CS-C 1,300 milliseconds (1.3 seconds) after Event A, and 900 milliseconds after Event B relative to UTC. CS-A and CS-B may report the occurrence of Events A and B to CS-C, including the event system time. Because of network topology, the report of Event B may arrive at CS-C 700 milliseconds after Event B occurred, and 200 milliseconds before Event C occurs. Because of remoteness and network latency, the report of Event A may arrive at CS-C 2,900 milliseconds (2.9 seconds) after Event A occurred, and 1,600 milliseconds (1.6 seconds) after Event C occurred. To CS-C, the relative time (order) of these events based on when Event C occurred within CS-C and the reports of Events A and B arrived to CS-C is B C A, even though the absolute order according to UTC is A B C.

A collision refers either to identical digests being produced from a SHA (digest collision), or an incidence of two or more blocks occurring simultaneously (block collision). A digest collision, however unlikely, is theoretically possible from differing input strings. A digest collision may result from multiple computing systems producing identical digests simultaneously to each other, or nearly so, while participating in, for example, a blockchain network. A block collision may occur when two (or more) computing systems participating in a blockchain network produce and/or deliver and/or receive blocks either at the same time, or having identical timestamps. Blockchain systems comprise methods to mitigate each of these collision types in a manner that prevents the blockchain(s) from failing or stalling. For example, a computing system receiving a block from another blockchain bearing an identical timestamp to the receiving computing system's latest native block may simply ignore the incoming block's timestamp and treat the incoming block as arriving immediately after the latest native block. Similarly, a blockchain participating computing system receiving a block from another blockchain simultaneous to the production of a native block may be configured to treat the incoming block as arriving after the new native block regardless of the incoming block's timestamp. A blockchain participating computing system receiving a block from each of two (or more) participating computing systems may be configured to order the multiple incoming blocks based on one of each block's timestamp, length (also called height) of each sending blockchain, blockchain ID serialization, etc.

Collision resistance refers to an unlikelihood of different input strings producing a digest collision. (Because resolving a block collision is simply a matter of choosing how to order blocks, block collision resistance is not a significant concern.) Because SHA256 may produce up to $2^{256}$ distinct digests, collision resistance may be deemed quite high. In some computing applications, SHA256 collision resistance may be theoretically decreased by artificially imposing one or more limitations on acceptable result digests. In other words, a particular application may enforce a rule of x consecutive bits having a value of 0, effectively reducing the number of distinct digests which the particular application may accept as output from SHA256. Because SHA is a one-way cryptographic function, such an output-limiting rule cannot serve as an input parameter for SHA256, but only as a post-process implementation necessitating iteratively producing digests with varying input strings until a rule-compliant digest is produced. In at least some blockchain implementations, varying the input string may be accomplished by prepending or appending a nonce to the input string, and incrementing the nonce or randomly generating, or otherwise obtaining, a random new nonce with each iteration of SHA until a rule-compliant digest is produced.

Collision resolution refers to system(s) or method(s) of deprecating all identical digests but one, such that each deprecated digest may be abandoned. When a digest is abandoned, the block of which the abandoned digest is an element may also be abandoned.

Nonce refers to an arbitrary integer (e.g., 32-bit integer). A nonce may be a member of a series of nonces. In some embodiments, a nonce is randomly generated or pseudo randomly generated for each use iteration. In other embodiments, a nonce may be incremented to a next value for each successive use iteration. An initial nonce (a nonce for a first iteration of a block generation cycle) may be selected, for example without limitation, by an algorithm generating a 32-bit integer, or by a protocol-stipulated initial value. A next nonce (a subsequent iteration for the same block generation cycle) may be by an algorithm again generating a 32-bit integer, or by a protocol-stipulated incrementing of the previously used nonce. In one embodiment, a nonce may be generated anew for each iteration without regard for the value of the preceding nonce.

Proof-of-work refers to a digest which is compliant with an output limitation rule imposing a requirement of x consecutive bits having a value of 0. Because a SHA does not take an output-controlling parameter, a digest can be compared to the rule after generation. A digest complying with the rule is produced by iteratively generating digests until a compliant digest results. The compliant digest may serve as demonstrative evidence ("proof") that an amount of computer processing ("work") was expended to produce the digest. An output limitation rule may similarly require x consecutive bits having a value of 1, or a defined substring of a particular length with a particular order of 0s and 1s. A higher (longer) proof-of-work requirement may result in a lower collision resistance.

Target difficulty refers to an element which specifies a particular limitation to form a proof-of-work-compliant digest. For example without limitation, a target difficulty may indicate a digest must have ten (10) consecutive 0-bits in order to qualify as a proof-of-work digest.

Transaction customarily can refer to (a) an exchange, such as an exchange of goods/service for goods/services, goods/ services for payment, exchange of debts, exchange of promises, exchange of obligations, etc.; and (b) a computer function whereby a transaction of type (a) is recorded or otherwise processed; and (c) a computer function whereby a transaction of type (b) is recorded. By way of example, a type (a) transaction may be a sale of a Widget for cash; a related type (b) transaction may be decrementing the number of Widgets in stock as a result of the sale; and a related type (c) transaction may be a computer log entry recording information (for example, user identity, login time, access to inventory software, subtraction of the sold Widget, etc.) about the access which performed the stock decrement. Transactions of type (c) may also include records of installation, modification, or deletion of firmware or software, including image size, digital signature, license, certificate, etc.

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

The terms "a" and "an" can be described as one, but not limited to one. For example, although the disclosure may recite "a collection having a digest," the disclosure also contemplates that the collection can have two or more digests.

Unless otherwise stated, all ranges include both endpoints and all numbers between the endpoints.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

FIG. 1 is a diagram of a block 10 of a blockchain within a computing system 1 according to an embodiment of the present disclosure. The block 10 may include a header 11 and a payload 13. The block 10 may be produced or otherwise implemented on the computing system 1 by a blockchain implementation, according to an embodiment of the present disclosure. The block 10 of FIG. 1 comprises a block identifier (or block ID) 12, a blockchain version (or blockchain version identifier) 14, a blockchain identifier (or blockchain ID) 16, a timestamp 18, a proof-of-work region (or POWR) 20 (which may be considered a set within the meaning of mathematical set theory), a block digest 30, a target difficulty 40, a block nonce 50, and a collection 60 of contributing block digests. The block 10 may include one or more record digest(s) 70, 72, 74 (e.g., merkel roots), including a record digest 70 of the instant block 10 and one or more record digests 72, 74 of blocks of participating neighbor blockchains. The record digests 70, 72, 74 may be considered a set within the meaning of mathematical set theory. The block 10 may include one more block headers 80, 82 of blocks received from other blockchains (e.g., participating neighbor blockchains).

The block 10 may include a collection 90 of records within the payload 13. The collection of records may comprise transaction records. A transaction record may comprise an entry of information concerning a transaction.

The header 11 of the block 10 may comprise the block ID 12, the blockchain version 14, the blockchain ID 16, the timestamp 18, the POWR 20, the block digest 30, the target difficulty 40, the block nonce 50, the collection 60 of contributing block digests, and a record digest 70 (merkel root) of the transactions of the block 10. The payload 13 may comprise the collection 90 of records.

The block ID 12 may be a sequential identifier indicating a relative order of the block 10 in the blockchain to which the block 10 belongs. The blockchain version identifier 14 may indicate the particular version of blockchain protocol under which the blockchain that created the block 10 is operating. The timestamp 18 may be an indicator of the system time, according to a timekeeping subsystem of the computing system 1 hosting the blockchain, at which the block 10 was created. The POWR 20, the block digest 30, the target difficulty 40, and the collection 60 of contributing block digests are further described below. The form and order of the above elements within the block 10 may be governed by the blockchain protocol under which the blockchain that created the block 10 operates.

The computing system 1 may be any appropriate computing system including one or more computing devices, each comprising one or more processors, one or more computer readable media, one or more electronic memory, one or more input/output devices, and/or one or more communication interfaces.

The order of the elements 12-90 shown in FIG. 1 is for the convenience of the reader, and not a requirement of a particular embodiment of the disclosure. An embodiment of the present disclosure may have more elements than described herein, or fewer.

Figure 2:
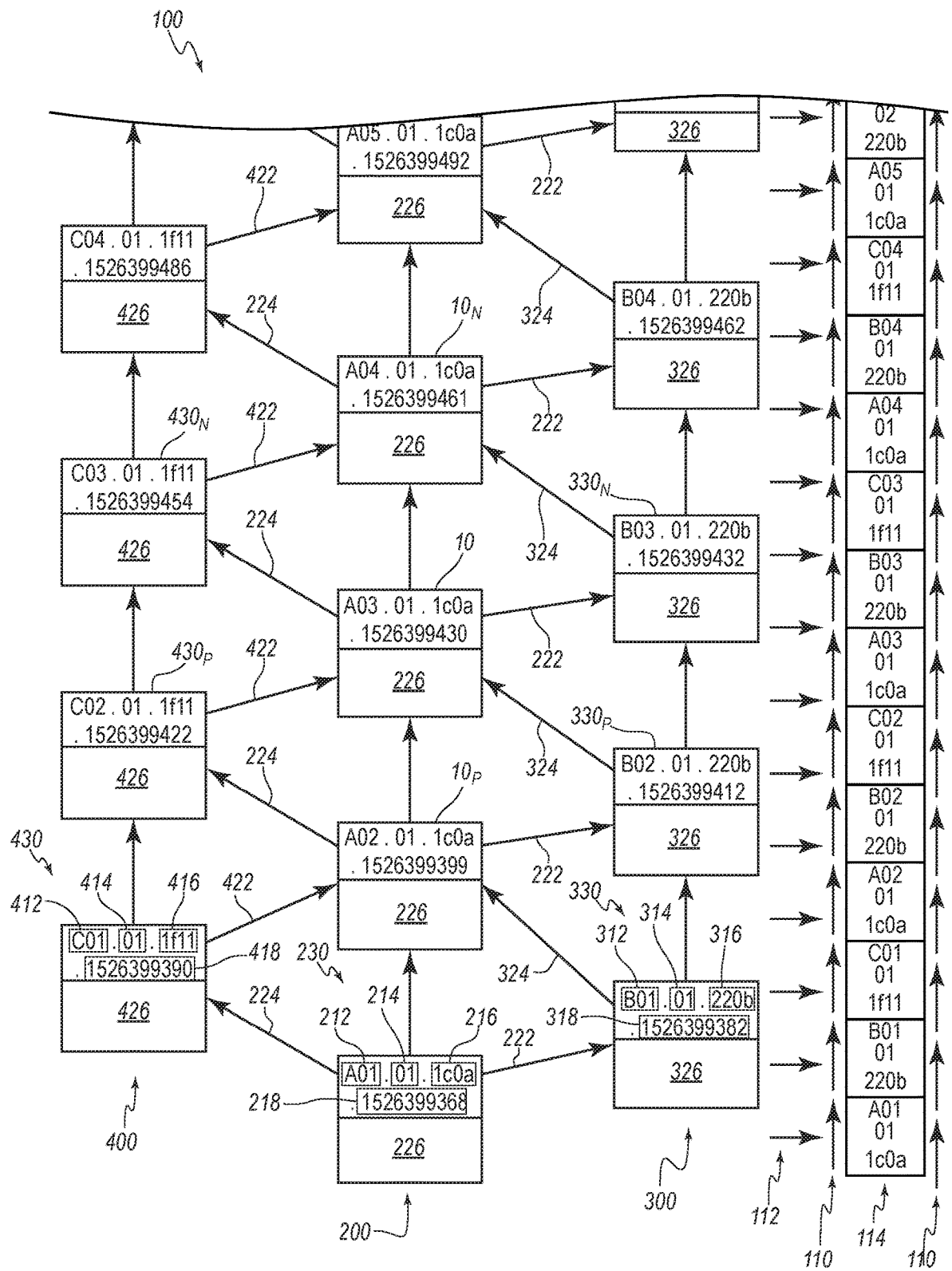
FIG. 2 is a diagram of a cross-merkelizing blockchain network, according to an embodiment of the present disclosure, comprising three participating blockchains, namely a principal blockchain, a first participating neighbor blockchain, and a second participating neighbor blockchain.

FIG. 2 is a diagram of a cross-merkelizing blockchain network 100 comprising three participating blockchains, namely a principal blockchain 200, a first participating neighbor blockchain 300, and a second participating neighbor blockchain 400, according to an embodiment of the present disclosure. The principal blockchain 200 comprises a series of blocks, according to an embodiment of the present disclosure, of which a block 230 is identified. The block 10 of FIG. 1 is also shown in the context of the blockchain network 100 and the principal blockchain 200. Although FIG. 2 depicts three participating blockchains 200, 300, 400 in the blockchain network 100, a blockchain network according to the present disclosure may have fewer (but at least two) or more participating blockchains. Furthermore, the blockchain network 100 may be a multiplexing network.

The block 230 of the principal blockchain 200 comprises at least a unique block ID 212, a blockchain version 214, a blockchain ID 216, a timestamp 218, and a data region 226. The unique block ID 212 may be analogous to (and value-wise distinct from) the unique block ID 12 of the block 10. The blockchain version 214 may be analogous to the blockchain version 14 of the block 10. The blockchain ID 216 may be analogous to the blockchain ID 16 of the block 10. The timestamp 218 may be analogous to (and value-wise distinct from) the timestamp 18 of the block 10. The data region 226 may include elements analogous to other elements of the block 10 of FIG. 1, and may include elements not identified in FIG. 1. A block 330 of the first participating neighbor blockchain 300 is identified, having elements 312, 314, 316, 318, 326 that may be generally analogous to the block 230 of the principal blockchain 200. A block 430 of the second participating neighbor blockchain 400 is identified, having elements 412, 414, 416, 418, 426 that may be generally analogous to the block 230 of the principal blockchain 200.

Each of the blocks 230, 330, 430 is represented at the lowest aspect of the respective blockchains 200, 300, 400, although this is for ease of reference only. The blocks 230, 330, 430 may be succeeded each by a series of blocks within the respective blockchain 200, 300, 400 of each block 230, 330, 430. By way of example, the block 230 of the principal blockchain 200 is shown to have a succeeding block $10_P$, to which the block 10 is a subsequently succeeding block, and the block 10 is shown with a further succeeding block $10_N$. Each of the succeeding blocks $10_P$, 10, $10_N$, etc., of the principal blockchain 200 has a timestamp analogous to the timestamp 218 of the block 230. The timestamp of each succeeding block $10_P$, 10, $10_N$ is shown as recording successively later times. Within the principal blockchain 200, the timestamps recorded in each succeeding block form at least a logical order of events within the principal blockchain 200. In other words, the timestamp of each block within the principal blockchain 200 is derived from the system time of the computing system in which the blocks are generated.

The participating neighbor blockchains 300, 400 similarly are represented having successively later succeeding blocks $330_P$, $430_P$, and otherwise generally and functionally resemble the principal blockchain 200. Like the succeeding block timestamps of the principal blockchain 200, succeeding block timestamps of each participating neighbor blockchain 300, 400 form an immutable order sequence reference within the respective blockchain 300, 400.

The principal blockchain 200 may be resident within the computing system 1 of FIG. 1 from which the blockchain 200 derives the time for each succeeding block timestamp. Each participating neighbor blockchain 300, 400 may similarly reside within a respective, distinct computing system analogous to the computing system 1 of the principal blockchain 200. Each participating neighbor blockchain 300, 400 may derive the time for each succeeding block timestamp with the respective blockchain 300, 400 from the system time of the computing system (analogous to the computing system 1 of the blockchain 200) wherein the respective participating neighbor blockchain 300, 400 resides. As may be well understood by one of ordinary skill in the art, each of the computing systems (analogous to the computing system 1 of the principal blockchain 200) may have differing system time settings and/or mechanisms.

As each participating blockchain 200, 300, 400 completes each succeeding block, the block is communicated to at least one participating neighbor blockchain. For example, each block of first participating neighbor blockchain 300 may be communicated 324 to at least the principal blockchain 200, and each block of the second participating neighbor blockchain 400 may be communicated 422 to at least the principal blockchain 200 as each block is created. The principal blockchain 200 may be agnostic with regard to the relative time of production of a block within a participating neighbor blockchain 300, 400. As each such block of a participating neighbor blockchain 300, 400 is communicated 324, 422 to the principal blockchain 200, the principal blockchain 200 may be aware of a relative time that the blockchain 200 becomes aware of the existence of the block from the participating neighbor blockchain 300, 400. More broadly, as each of the blockchains 200, 300, 400 creates a block, for example the blocks 230, 330, 430 respectively, and communicates the same among the other blockchains 200, 300, 400 within the blockchain network 100, each of the blockchains 200, 300, 400 may note 112 the creating of each succeeding block and may order 114 the blocks in a time-advancing 110 series. In other words, each blockchain 200, 300, 400 may be aware of the time order 114 of the creation (or communication of creation) of each block of each blockchain 200, 300, 400 in the blockchain network 100. See FIGS. 5-6, below.

Reference is now made to FIGS. 1 and 2. In the present example, the block 10 of FIG. 1 is a member of the principal blockchain 200 in FIG. 2. The block ID 12 may be unique to the block 10. In other words, each block in a blockchain may have a unique block ID 12. The blockchain version 14 may identify the particular implementation of blockchain protocol used by the principal blockchain 200 in producing the block 10. The blockchain ID 16 may identify the particular blockchain 200 of which the block 10 is a member. The blockchain ID 16 is shown as a 4-byte hexadecimal representation as a matter of convenience only and is not a requirement of this disclosure. The blockchain ID 16 may be formed in a variety of different ways, provided the blockchain ID 16 can be unique to each blockchain. The timestamp 18 may report the system time at which the block 10 was produced. The timestamp 18 may take the form of, for example without limitation, a Unix epoch timestamp, or any other form compliant with an embodiment of a blockchain protocol according to this disclosure.

The collection 60 of contributing block digests comprises most recent block digests 66, 64, 62 from each blockchain 200, 300, 400 participating in the blockchain network 100. In the example of FIG. 1, the block digests collection 60 comprises the block digest 62 of a most recent block of the first participating neighbor blockchain 300, the block digest 64 of a most recent block of the second participating neighbor blockchain 400, and the block digest 66 of a most recent block in the principal blockchain 200 immediately preceding the block 10.

The block digest 30 is created by merkelizing the block digest 62 and block digest 64. In other words, the block digests 62, 64 (for blocks from participating neighbor blockchains) are concatenated so as to form a single 64-byte string, which is then processed through SHA. The output of merkelizing the block digests 62, 64 through SHA is a 32-byte string wholly comprising the block digest 30. Because each block digest 62, 64, 66 is contributed by a different blockchain 200, 300, 400, the merkelization of these block digests 62, 64, 66 is, in particular, cross-merkelization. In a blockchain network having more than three participating blockchains, the block digests collection 60 may comprise a block digest from each participating blockchain, and each such block digest may be cross-merkelized, and a merkle root of block digests produced to generate the block digest 30. The block 10 includes the block digest 66, which was produced in the same manner as part of the most recent block $10_P$ prior to and within the principal blockchain 200. The block digest 66 may connect the block 10 to the most recent previously created block $10_P$ within the principal blockchain 200. Similarly, a protocol of the blockchain 200 of the block 10 may pass the block digest 30 to the immediately succeeding block $10_N$ in the principal blockchain 200. In this manner, the block $10_N$ succeeding the block 10 is connected to the block 10, and the block 10 is connected to the most recent block $10_P$ preceding the block 10. This interconnection of blocks is inherent throughout the principal blockchain 200 and serves to connect each block to its immediate predecessor and successor. Similarly, the block digest 62 may have been passed from the participating neighbor blockchain 300 to the principal blockchain 200, and the block digest 64 may have been passed from the participating neighbor blockchain 400 to the principal blockchain 200. This connects the block 10 to an immediately preceding block $330_P$, $430_P$ within each participating neighbor blockchain 300, 400, similar to connecting the block 10 to the immediately preceding block $10_P$ within the principal blockchain 200.

The protocol of blockchain 200 of block 10 may likewise direct a passing 222, 224 of the block digest 30 to each participating neighbor blockchain 300, 400 such that an immediately succeeding block $330_N$, $430_N$ of each participating neighbor blockchain 300, 400 may be connected to the block 10 of the principal blockchain 200. In this manner, each participating blockchain 200, 300, 400 is connected to each other participating blockchain 200, 300, 400. More particularly, the principal blockchain 200 is directly connected to each participating neighbor blockchain 300, 400 by having directly received from each participating neighbor blockchain 300, 400 previous block digests 62, 64 of the blocks $330_P$, $430_P$; and by sending the block digest 30 to each of the participating neighbor blockchains 300, 400. The participating neighbor blockchains 300, 400 are indirectly connected to each other as a result of each participating neighbor blockchain 300, 400 sending block digests (analogous to digests 62, 64) to the principal blockchain 200, and receiving from the principal blockchain 200 block digests (analogous to digests 64, 62) of the other participating neighbor blockchain 400, 300. The blockchain protocol of each participating blockchain 200, 300, 400 may cross-merkelize the digests (analogous to 62, 64, 66) into each participating blockchain's next succeeding block. This cross-merkelization process may proliferate throughout the blockchain network 100, thereby interconnecting the participating blockchains 200, 300, 400 in a cryptographically and independently verifiable manner. By sharing (i.e., sending a block digest 30) to other participating neighbor blockchains 300, 400 in the blockchain network 100, the immutability (i.e., of the data, which is enabled by a blockchain) is decoupled from the consensus (i.e., to add a block) of the participating blockchains 200, 300, 400.

Figure 3A:
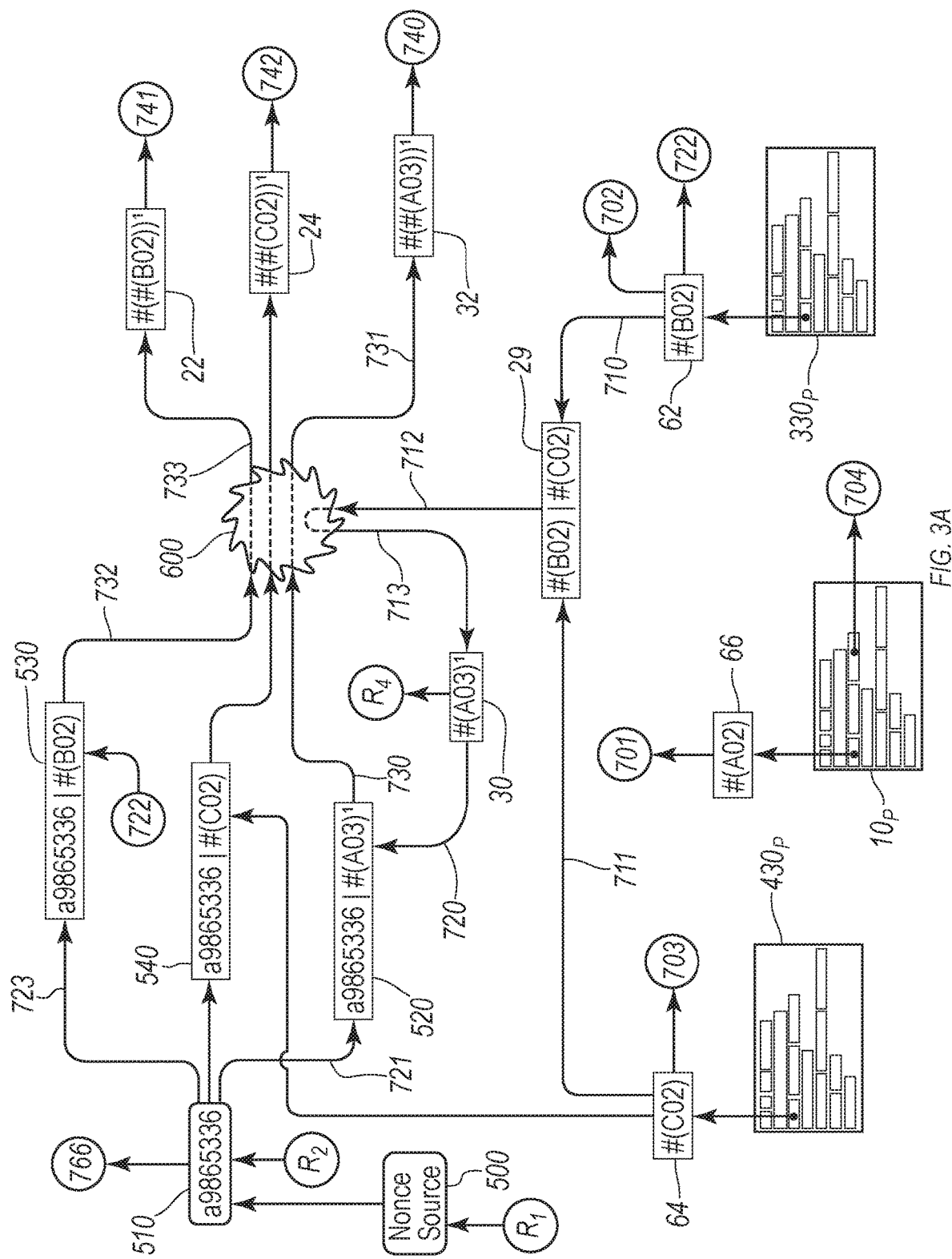
FIG. 3A is a partial flow diagram illustrating cross-merkelization of the blocks from the participating neighbor blockchains within the principal blockchain of FIGS. 1-2.
Figure 3B:
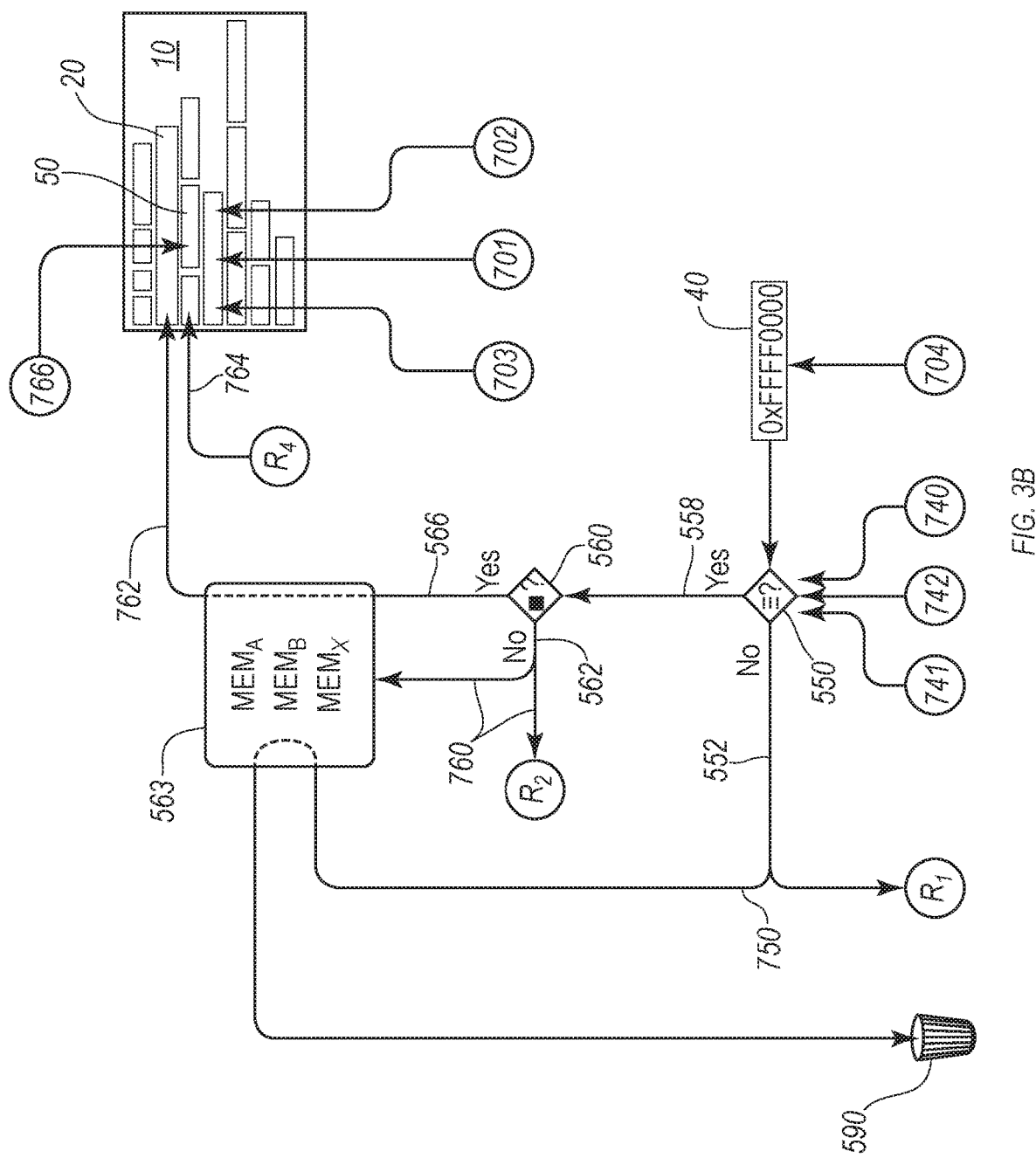
FIG. 3B is a partial flow diagram illustrating creation of a block.

FIG. 3A is a partial flow diagram illustrating cross-merkelization of the blocks $330_P$ and $430_P$ of the participating neighbor blockchains 300, 400 with the principal blockchain 200 of FIGS. 1-2, according to an embodiment of the present disclosure. FIG. 3B is a partial flow diagram illustrating creation of the block 10. Referring to FIGS. 3A and 3B, the block 10 may be immediately preceded in the principal blockchain 200 by the block 10$_P$. A block digest 66 of the block 10$_P$ may be passed 701 directly to the block 10. The block digest 66 may serve as reference to the preceding block 10$_P$, the block immediately preceding the block 10. The latest preceding block 330$_P$ of the participating neighbor blockchain 300 may be communicated (see 324 in FIG. 2) to the principal blockchain 200. The digest 62 of the block 330$_P$ may be extracted and passed 702 directly to the block 10. Similarly, a latest preceding block 430$_P$ of the participating neighbor blockchain 400 may be communicated (see 422 in FIG. 2) to the principal blockchain 200, and the block digest 64 extracted and passed 703 directly to the block 10.

The target difficulty 40 may also be extracted 704 from the preceding block 10$_P$. In one embodiment, the target difficulty 40 may also be extracted from the block 330$_P$, 430$_P$ of the participating neighbor blockchain 300, 400 for comparison to the target difficulty 40 of the preceding block 10$_P$ as an additional validity check prior to including data from the participating neighbor blockchain 300, 400 into the block 10.

The block digest 62 from the block 330$_P$ and the block digest 64 from the block 430$_P$ may be concatenated together 710, 711 to form an input string 29. The order of appearance in the concatenation may be set as a requirement of a particular implementation of the blockchain protocol of the blockchain network 100. The input string 29 may then be communicated to 712 and processed through a SHA 600 to generate 713 a block digest 30 for the block 10. The block digest 30 may be passed 764 (through R4) to the block 10. At a later stage, when the principal blockchain 200 is generating the succeeding block 10$_N$, the block digest 30 may be passed as an element of the block 10 to the block 10$_N$, and may serve as a reference from the block 10$_N$ back to the block 10, which includes the block digest 66 as a reference to the preceding block 10$_P$. This procedure of including each previous block's block digest into the succeeding block forms a chain of referential connectivity between each block of a blockchain so as to establish an immutable record of block order within the blockchain. This immutable ordering of blocks within a blockchain inherently establishes an immutable record of the data included in each of the blocks of the particular blockchain, and, hence, of each participating blockchain in the blockchain network 100. Also, the immutability is decoupled from any requirement by an individual blockchain for consensus of the participating nodes to add a block.

A nonce source 500 may be utilized by each blockchain 200, 300, 400, each participating blockchain 200, 300, 400 having its own nonce source 500. A nonce source 500 may be a computing process which generates a random nonce for each iteration, or may be a computing process which generates an initial nonce for a first iteration, and thereafter increments or otherwise varies the nonce for each successive iteration. A candidate nonce 510 may be received from the nonce source 500. The manner of selecting a first candidate nonce 510 may be prescribed by the blockchain protocol of the participating blockchain 200, 300, 400, and may be defined by a protocol of the blockchain network 100. A candidate nonce 510 and the block digest 30 may be concatenated together 720, 721 to form an input string 520. The input string 520 may then be processed 730 by the SHA 600 to produce 731 a candidate proof-of-work (POW digest) 32 based on the block digest 30. The candidate POW digest 32 may then be compared 740 with the target difficulty 40 at 550. In other words, the POW digest 32 is produced by "hashing the hash" where the hash to be hashed is the block digest 30, thus, the POW digest 32 is a double-hash.

The target difficulty 40 is shown as a hexadecimal value in the present example; however, neither the explicit expression 0xFFFF0000 nor the hexidecimal format is required by this disclosure. The target difficulty 40 may be expressed in a form that conveys to each blockchain 200, 300, 400 of the blockchain network 100 a specific number of consecutive bits having an "off" value (or bytes having a "0" value) appearing at either the big or little end of a resulting digest in order to qualify as a POW. In another embodiment, the target difficulty 40 may be structured to require a specific number of consecutive bits having an "on" value (or bytes having a "1" value). In another embodiment, the target difficulty 40 may require a specific sequence of "off" and "on" bits ("0" and "1" bytes) spanning a designated portion of the candidate POW digest 32.

If the candidate POW digest 32 does not comply 552 with the target difficulty 40, the candidate POW digest 32 and the candidate nonce 510 are abandoned 590 and the blockchain returns R$_1$ to the nonce source 500. A new candidate nonce 510 is selected. The manner of selection of the new candidate nonce 510 may be prescribed by the blockchain protocol of the participating blockchain 200, 300, 400, and may be defined by the protocol of the blockchain network 100, such as, for example without limitation, by always incrementing the nonce value with each iteration, or by always decrementing with each iteration. The new candidate nonce 510 may be concatenated to the block digest 30 then processed through the SHA 600, then compared 550 for compliance with the target difficulty 40. These steps may iterate repetitively, with a new candidate nonce 510 for each iteration, until a candidate POW digest 32 is produced which complies with the target difficulty 40.

If the candidate POW digest 32 complies 550 with the target difficulty 40, the candidate POW digest 32 is passed 558 to a cursory test 560 to determine if any other POW digests are required to complete the block 10 POWR 20. Because the current candidate POW digest 32 is a product of the current block 10, at least one additional POW digest is required. In the current example, two additional POW digests are needed. For this reason, the "last digest" test 560 fails 562. The current candidate POW digest 32 may be placed 760 in temporary memory 563, and the blockchain 200 returns R$_2$ to the current candidate nonce 510. The candidate nonce 510 producing the successful candidate POW digest 32 is reused 723 by concatenating the candidate nonce 510 with the digest 62 (722) to produce an input string 530. The input string 530 may be passed 732 to the SHA 600 to produce 733 a candidate POW digest 22. The candidate POW digest 22 is then processed 741 to compare to the target difficulty 40. If the current candidate POW digest 22 does not comply 550 with the target difficulty 40, the current candidate POW digest 22 and candidate nonce 510 are abandoned 552, 590. Furthermore, the previous candidate POW digest 32 is removed 750 from the temporary memory 563 and abandoned 590. The blockchain 200 then returns R$_1$ to select a new candidate nonce 510.

If the candidate POW digest 22 complies 550 with the target difficulty 40, the candidate POW digest 22 may be stored 760 in the temporary memory 563 along with the previous candidate POW digest 32. The blockchain continues to iterate through nonce selection R$_1$, R$_2$ until a candidate POW digest 32, 22, 24, etc. complying with the target difficulty 40 has been generated for each latest block digest 66, 62, 64, etc. of the principal blockchain 200 and the participating neighbor blockchains 300, 400, etc. Once a target difficulty 40 compliant candidate POW digest 32, 22, 24, etc. has been generated for each block digest 66, 62, 64, etc., each of the candidate POW digests 32, 22, 24, etc. may be retrieved 566 from the temporary memory 563 to be placed 762 in the POWR 20 of the block 10. The principal blockchain 200 may also store 766 the successful candidate nonce 510 as the block nonce 50 in the block 10.

Once the block 10 has been generated, the principal blockchain 200 may pass the block 10 to each of the participating neighbor blockchains 300, 400. The block 10 includes the block digests 62 and 64, which the blockchain 200 received from the last previous block $330_P$, $430_P$ of each of the respective participating neighbor blockchains 300, 400. In other words, an element of the block 10 is the digest 62 from the first participating neighbor blockchain 300 last previous block $330_P$. Accordingly, the block digest 62 is received from, then sent back to, the participating neighbor blockchain 300, which allows the participating neighbor blockchain 300 to check or otherwise monitor the integrity of its own stored data and/or transactions. Likewise, the block digest 64 was received from, and will be sent back to, the second participating neighbor blockchain 400, allowing the second participating neighbor blockchain 400 to verify or otherwise monitor its own integrity of stored data and/or transactions. The POWR 20 of the block 10 provides assurance to each of the participating neighbor blockchains 300, 400 of the validity of the block 10, thereby assuring each of the participating neighbor blockchains 300, 400 that each is receiving the respective block digests 62, 64 as the block digests 62, 64 were received at the principal blockchain 200. Similarly, the block 10 conveys to each of the participating neighbor blockchains 300, 400 the block digest 30. Each of the participating neighbor blockchains 300, 400 will return the block digest 30 to the principal blockchain 200 with the next subsequent block from each participating neighbor blockchain 300, 400. This permits the principal blockchain 200 to authenticate to itself the veracity of the blockchain 200, and hence the transactional records of each block of the blockchain 200. Furthermore, because the principal blockchain 200 transmits to each of the participating neighbor blockchains 300, 400 the successful candidate nonce 510, each of the participating neighbor blockchains 300, 400 can process each previous block digest 62, 64, 66 through SHAs using the disclosed successful candidate nonce 510 to ensure that the POWR has been generated according to the blockchain protocol, and that each block digest 62, 64, 66 is correct. In this manner, each participating blockchain may have high confidence as to the integrity of the data—including the order of transactions and digests—of each participating blockchain 200, 300, 400, even though each participating blockchain 200, 300, 400 is unaware of the actual data of every other participating blockchain 200, 300, 400. This creates an immutable record for each blockchain 200, 300, 400 without a prior need for trust and without a reliance on consent other than to participate in the blockchain network 100. In other words, the immutability of the data is decoupled from the consensus of the participating blockchains 200, 300, 400.

Furthermore, the ability of each participating blockchain 200, 300, 400 to independently verify that the candidate nonce 510 and previous block digests (analogous to block digests 62, 64, 66 of FIGS. 1, 3A) produce target difficulty-compliant digests (analogous to POW digests 22, 24, 32 of FIG. 3A) enables each of the participating blockchains 200, 300, 400 to recognize an anomaly relative to data of one of the participating blockchains 200, 300, 400. In other words, if the participating neighbor blockchain 300 performs a verification of the block digests (analogous to the block digests 62, 64, 66) using the candidate nonce 510 reported by principal blockchain 200, and any one of the resulting digests from the verification process fails to match the corresponding POW digest reported by the principal blockchain 200, the participating neighbor blockchain 300 may identify the digest anomaly to each participating blockchain 200, 300, 400. This permits the detection of a data anomaly in a participating blockchain 200, 300, 400 of the blockchain network 100 within moments of the event which caused the anomaly and without disclosure of the actual data involved. Additionally, the participating blockchain 200, 300, 400 identifying the anomaly can also bundle the previously known correct block data with the anomalous data identified and propagate a proof of misbehavior to each other participating blockchain 200, 300, 400, including that blockchain 200, 300, 400 in which the anomaly resides. This cross-reporting of the anomaly, or proof of misbehavior, may enable each participating blockchain 200, 300, 400 to insulate itself from possible injection of bad data, and also provides an audit trail for each computer system owner/operator to isolate, to within a few moments, the occurrence of the anomalous data, regardless of source. For example, in a worst case scenario, if anomalous data is detected by the participating neighbor blockchain 400 in a block from the participating neighbor blockchain 300, and the computing system(s) of the entity operating the participating neighbor blockchain 300 is/are so severely compromised that the computing system owner/operator is unable to locate the anomaly by internal means, the data from any other participating blockchain 200, 400 may enable reconstruction of the anomaly event and assist in correction and mitigation.

The process of cross-merkelization described above may also be referred to as mutual merge mining because each participating blockchain 200, 300, 400 produces blocks simultaneously, and without dependency on each of the other participating blockchains 200, 300, 400, while incorporating any blocks which may be presented by each of the other participating blockchains 200, 300, 400.

Figure 4:
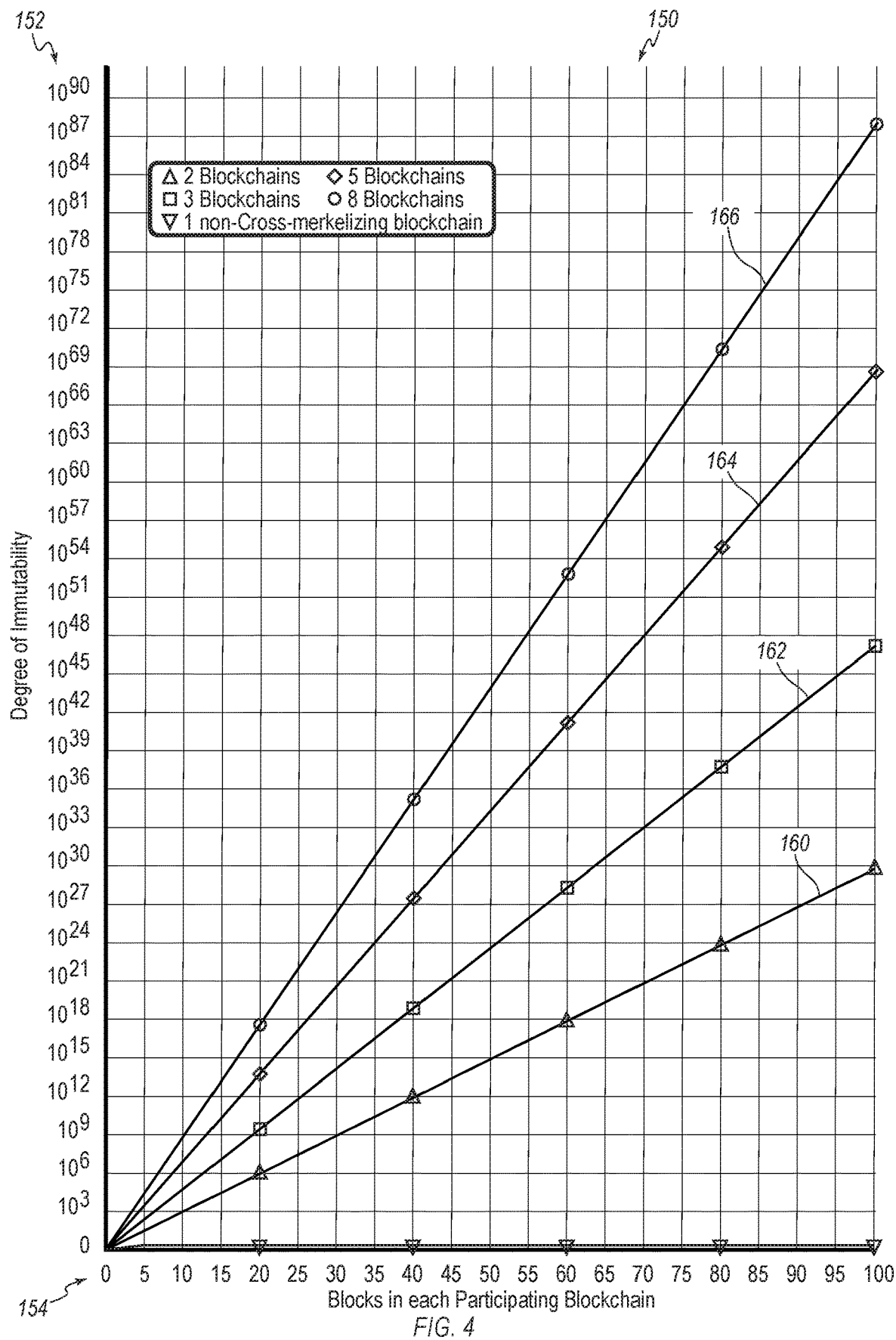
FIG. 4 is a graph illustrating a geometrically progressing degree of immutability which may be achieved in a blockchain network, according to an embodiment of the present disclosure, such as the blockchain network of FIGS. 1-3B.

FIG. 4 is a graph 150 illustrating a geometrically progressing degree of immutability which may be achieved in a blockchain network, such as the blockchain network 100 of FIGS. 2-3B, according to an embodiment of the present disclosure, as well as for a non-networked blockchain. For the present example, degree of immutability refers to how iteratively nested an initial block digest is within a given child block. In other words, the degree of immutability of the initial block is 1 within the initial block, 2 after the second block, 4 after the third block, 8 after the fourth block, etc. In a networked blockchain, the degree of immutability for the initial block increases much more aggressively as the second block of a particular blockchain has the initial block nested through cross-merkelization with participating neighbor blockchains. For example, in a blockchain network having three participating blockchains, such as the principal blockchain 200 of FIGS. 2-3B, the initial block has a degree of immutability of 6 after the second block, 21 after the third block, 44 after the third block, etc. Multiple nesting, in particular, set-wise nesting, further enhances immutability.

A vertical scale 152 of the graph 150 represents the degree of immutability which may be achieved in various implementations of the present disclosure. A horizontal scale 154 of the graph 150 represents a number of blocks created in the various implementations. Of note, the vertical scale 152 of the graph 150 shows a visualization of the increase in immutability by three orders of magnitude for each scale mark, such that the graph 150 vertically spans 0 to $10^{90}$ (1 followed by 91 0s). More particularly, the graph 150 reflects, without limitation, a general tendency toward geometric progression of immutability.

Data line 160 represents the approximate degree of immutability of a non-networked blockchain for the first 100 blocks created. Data line 162 represents the approximate degree of immutability for a blockchain participating in a blockchain network of three participating blockchains, similar to the principal blockchain 200 of FIGS. 2-3B. Data lines 164 and 166 represent the degree of immutability of a blockchain in, respectively, a blockchain network of five and eight participating blockchains. Due to the vertical scale 152 being rendered in orders of magnitude, the data lines 160, 162, 164, 166 appear to depict a purely linear diversion. For reference, the degree of immutability of the data line 160 (representing the non-networked blockchain) after the 50th block is created is $2.815 \times 10^{14}$, and the degree of immutability of the data line 162 (representing a blockchain network of three blockchains) is $1.994 \times 10^{23}$, or $7.084 \times 10^{8}$ times greater than that of the non-networked blockchain. After 100 blocks, the blockchain represented by the data line 162 has a degree of immutability that is $4.517 \times 10^{17}$ times greater than the degree of immutability of the non-networked blockchain represented by the data line 160. A blockchain in a network of eight blockchains, represented by the data line 166, has a degree of immutability approximately $2.152 \times 10^{59}$ times greater than a non-networked blockchain after 100 blocks.

Figure 5:
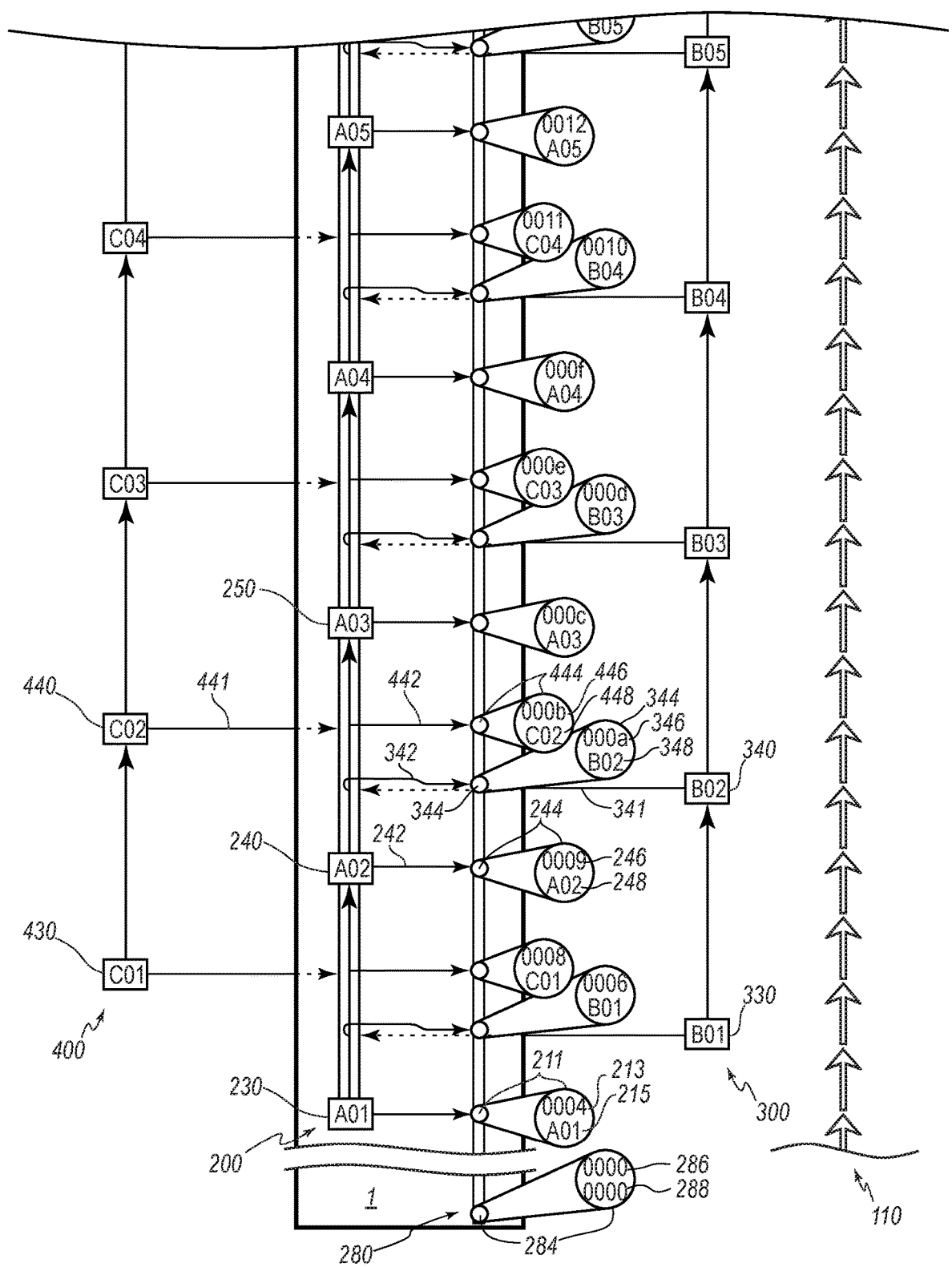
FIG. 5 is a partial block diagram of operations executing within a computing system, the diagram showing a principal blockchain and an event log, according to an embodiment of the present disclosure.

FIG. 5 is a partial block diagram of some operations executing within a computing system, such as the computing system 1 of FIGS. 1-3B, comprising the principal blockchain 200 and an event log 280, according to an embodiment of the present disclosure. The elements of FIG. 5 are generally analogous to corresponding elements of FIG. 2. The blocks 230, 330, 430 of the, respectively, principal blockchain 200 and first and second participating neighbor blockchains 300, 400 are shown for reference. A time progression 110 is also shown for reference, and is analogous to the time progression 110 of FIG. 2. The principal blockchain 200 may be operated within or by the computing system 1. In addition to the principal blockchain 200, the computing system 1 may generate on an ongoing basis the event log 280. At least some of the communication of FIG. 5 may transpire within the same network as that of FIG. 2, which may be a multiplex network.

The event log 280 comprises a collection of event records represented in FIG. 5 by a series of pips within the diagram of the event log 280. An event record 284 is shown as an enlarged pip, and may be an event record in the event log 280 recording an initial startup of the computing system 1. The event record 284 may contain an initial sequence identifier (Seq. ID) 286, here shown as "0000" to represent a first and initial event record in the event log 280. The event record 284 may also comprise an identifier 288 representing the logical owner of the event. For the event record 284, the identifier 288 is illustrated as "0000" to represent, for example without limitation, a main operating system of the computing system 1. Each event record may further comprise an actionable item, as described below.

Each event record (represented by the series of pips along the event log 280) may be entered into the event log 280 in single sequential series. While each event record of the event log 280 may include a timestamp (not shown), such an entry in an event record may be for the benefit of the computer operator (not shown) performing a manual examination of the event log 280. The entries of the event log 280, and the event log 280 itself, may be time agnostic. Each event record succeeding the initial event record having the Seq. ID 286 of "0000" may be incremented by 1. In other words, the event record immediately following the initial event record 284 may have a Seq. ID of "0001."

By way of example, a block 230, analogous to the block 230 of FIG. 5, is shown having been generated by the principal blockchain 200 and having an associated event record 211 in the event log 280. The event record 211 has a Seq. ID 213 of "0004," suggesting for the present example, this is the fifth sequential event record in the event log 280. The event record 211 comprises an event identifier ("event ID") 215 of "A01" indicating the event record 211 is logically owned by the block 230 of the principal blockchain 200. For ease of reference, the value of "A01" for the event ID 215 associates the event record 211 to the block 230 of the principal blockchain 200 in FIG. 5, and analogously to the same block 230 in FIG. 2. At a subsequent point, the principal blockchain 200 is shown having generated a subsequent block 240. When the block 240 is generated, the principal blockchain 200 causes 242 an event record 244 in the event log 280. The event record 244 comprises a Seq. ID 246 of "0009" and an event ID 248 of "A02." The event ID 248 "A02" identifies the logical owner of the event record 244 as the block 240 of the principal blockchain 200. The Seq. ID 246 "0009" indicates the event record 211 is the tenth event record in the event log 280.

Subsequent to the creation of the block 240 of the principal blockchain, a block 340 is shown generated in the first participating neighbor blockchain 300. The participating blockchain 300 passes 341 the block 340 (or a cryptographic hash of the block 340 (e.g., a POW hash, block hash, and/or records hash) and any corresponding nonce) to the principal blockchain 200. The principal blockchain 200 creates 342 an event record 344 in the event log 280. The event record 344 comprises a Seq. ID 346 of "000a" and an event ID 348 of "B02." The Seq. ID 346 "000a" indicates the event record 344 is the eleventh event record in the event log. The event ID 348 "B02" indicates the logical owner of the event record 344 to be the block 340 of the first participating neighbor blockchain 300.

Subsequent to the creation of the blocks 240 and 340, the second participating neighbor blockchain 400 may generate a block 440. The second participating neighbor blockchain 400 passes 441 the block 440 (or a cryptographic hash of the block 440 (e.g., a POW hash, block hash, and/or records hash) and any corresponding nonce) to the principal blockchain 200. The principal blockchain 200 creates 442 an event record 444 in the event log 280. The event record 444 comprises a Seq. ID 446 of "000b" and an event ID 448 of "C02." The Seq. ID 446 "000b" indicates the event record 444 is the twelfth event record in the event log.

In one embodiment, the collection of entries in the event log 280 from the creation of a first block may be merkelized and included in a second block. In other words, using the principal blockchain 200 of FIG. 5 as an example, the entries into the event log 280 beginning at the creation of the block 240 and having Seq. ID 246, et seq., values from 0009 to 000b, inclusive, may be merkelized together and included in a next block 250 of the principal blockchain 200. The values used herein for the Seq. IDs 246, 286, 346, 446 are merely examples to illustrate that each successive event record 244, 344, 444 has an incremented Seq. ID 246, 346, 446 relative to each other. The particular event log 280 may comprise additional entries between the particular entries 244, 344, 444 associated to the creation of blocks in the principal blockchain 200 and the receipt by the principal blockchain 200 of blocks from the first and second participating neighbor blockchains 300, 400.

While the present example illustrates the event log 280 comprising only entries associated with blockchain blocks, in another embodiment, the event log may include other entries, as well. For example, the event log may include event records corresponding to any of a variety of events recorded in the blockchains, including actionable events that may result or otherwise prompt an action being taken. Similarly, the values "A02," "B02," and "C02" of the event IDs 248, 348, 448 are for ease of reference and do not necessarily reflect a specific event or event ID value in each respective event record 244, 344, 444. In other words, each blockchain block-associated event record 244, 344, 444 may comprise multiple data items relating to the particular associated blockchain block, such as, by way of example without limitation, the block ID, the block digest, the block timestamp, the blockchain ID, etc.

FIG. 5 illustrates the event log 280 of the computing system 1 hosting the principal blockchain 200. Each participating blockchain 200, 300, 400, etc., may likewise have an event log 280, with each such event log independent from each other event log.

Furthermore, due to network latency or similar issues, it is possible that, in the present example, a block of a participating neighbor blockchain 300, 400 may arrive at the principal blockchain 200 with a delay causing a technical mis-ordering of the event log, however, absent some other factor, this delay would be insignificant. Furthermore, a vector clock (described below) may correct the technical m is-ordering. In other words, at computer speeds a block could be created at the principal blockchain 200, for example, at a Time(1) while a block at either participating neighbor blockchain 300, 400 may have been created at a Time(0) wherein Time(1) is, for example, 500 milliseconds after Time(0), but the block from the participating neighbor blockchain 300 or 400 may arrive at the principal blockchain at a Time(2), with Time(2) being 800 milliseconds after Time(0) and 300 milliseconds after Time(1). Because the event log 280 is agnostic of time and entries are sequentially made according to the order received, the event record for the block logically associated to the block of the participating neighbor blockchain 300 or 400 may be sequentially after the event record for the block of the principal blockchain 200 even though the block of the principal blockchain 200 was technically created prior to the block of the participating neighbor blockchain 300, 400. A time difference in two consecutive or nearly consecutive entries in the event log likely is of no consequence considering a vector clock (described below) may correct any error in event record order.

Figure 6:
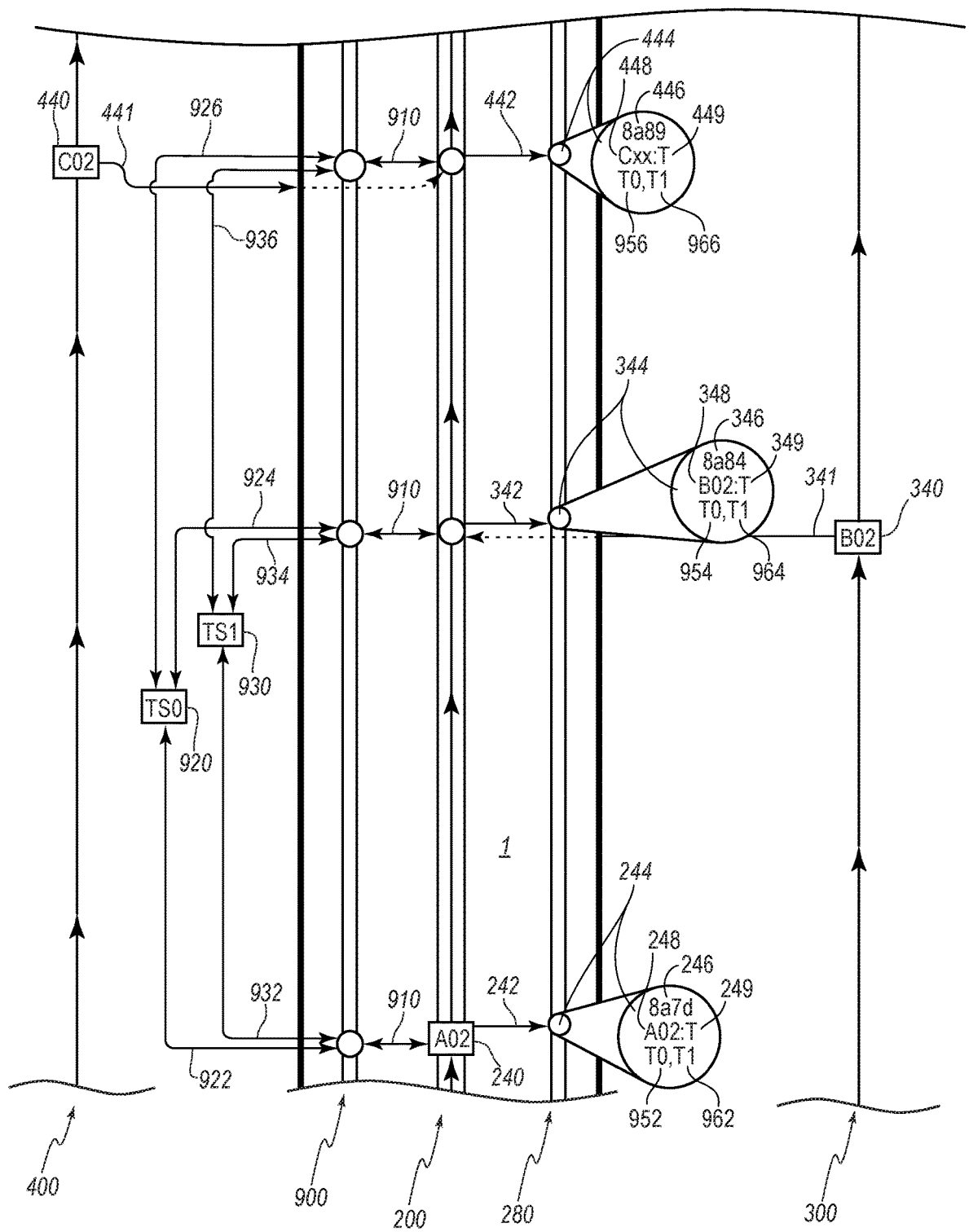
FIG. 6 is a detailed partial block diagram of operations of the computing system described in FIG. 5, according to an embodiment of the present disclosure.

FIG. 6 is a detailed partial block diagram of operations of the computing system 1 described in FIG. 5, according to an embodiment of the present disclosure. The area of detail in FIG. 6 corresponds to the region of the event log 280 related to the blocks 240, 340, 440 discussed above, and having a rough time validation implementation according to an embodiment of the present disclosure. The principal blockchain 200 is shown as a logical process within the computing system 1. The computing system 1 comprises all logical processes to operate the principal blockchain 200 (or otherwise implement a protocol of the principal blockchain 200), and further comprises the event log 280 and a time-based validation process 900. The first and second participating neighbor blockchains 300, 400 are also shown.

The time-based validation process 900 operates essentially time-agnostically, in that the time-based validation process 900 is not limited or controlled by the time subsystem of the computing system 1. The time-based validation process 900 sends and receives data and requests to enable and record comparison of a collection of timestamps, as further explained below.

The principal blockchain 200 is shown having generated a blockchain block 240. The block 240 may include a block timestamp (not shown, but see, e.g., 18 in FIG. 1) indicating the system time at which the block 240 was created. The principal blockchain 200 may communicate 910 with a time-based validation process 900 of the computing system 1. More particularly, the principal blockchain 200 may communicate 910 to the time-based validation process 900 a number of data related to the newly created block 240, such as, for example, a block ID, a block timestamp, a block digest, etc. The time-based validation process 900 may electronically contact 922 a first time server 920, sending to the time server a signed transmission including at least some of the data provided related to the newly created block 240, and request the first time server 920 respond with a signed time certificate (not shown). The method of requesting the current time from the first time server 920 may be any appropriate and standardized method or protocol suitable for obtaining the current time from a common time server, such as asymmetric key network time protocol. The first time server 920 may respond 922 by the same communication medium and send back the signed transmission and include a signed certificate of the current time at the first time server 920.

The time-based validation process 900, upon receiving the signed transmission returned from the first time server 920 along with the signed time certificate, may repeat this process, sending 932 the signed transmission to a second time server 930 along with a request for a signed time certificate (not shown). The second time server 930 may return by the same communication medium the signed transmission of data related to the newly created block 240 along with a signed time certificate (not shown) indicating the current time at the second time server 930. The time-based validation process 900 may then compare the time reported by the first time server 920 and the second time server 930 to determine if the variance in time reports falls within an acceptable limit established within the blockchain protocol. If the variance exceeds the blockchain protocol established-limit, the time-based validation process 900 may re-query either or both time servers 920, 930, or may send requests to one or more additional time servers analogous to the time servers 920, 930.

If the variance between the times reported by the first and second time servers 920, 930 is within the limit of the blockchain protocol, the time-based validation process 900 may then compare the block timestamp 18 to the signed time certificates received from the first and second time servers 920, 930. If a difference between the block timestamp 18 and the signed time certificates from the first and second time servers 920, 930 is within a time variance allowance as established by the blockchain protocol, the time-based validation process 900 sends to the principal blockchain 900 the signed transmission comprising data related to the newly created block 240, along with the signed time certificates and a signal (not shown) indicating proper time-based validation. In another embodiment, the time-based validation process 900 may directly cause 242 creation of the event record 244 in the event log 280. In another embodiment, the time-based validation process 900 may trigger another process operating within the computing system 1 to cause 242 the creation of the event record 244.

The event record 244 in the event log 280 related to (or logically owned by) the newly created block 240 may comprise a Seq. ID 246, an event ID 248 indicating the logical owner of the event record 244, a block timestamp 249 (analogous to the block timestamp 18 of FIG. 1), and the times recorded in the signed time certificates received from the first and second time servers 920, 930.

The first participating neighbor blockchain 300 is shown having generated a block 340 at a time after the block 240 was generated by the principal blockchain 200. The block 340 may be sent 341 to the principal blockchain 200. The receipt of the block 340 is communicated 910 to the time-based validation process 900. The time-based validation process 900 may query 924, 934 the first and second time servers 920, 930 as described above. If the difference between the block timestamp of the block 340 (analogous to the block timestamp 18 of FIG. 1) and the signed time certificates received from the time servers 920, 930 fall within the blockchain protocol variance limit, the event record 344 is made 342 in the event log 280 and comprises data associated to the block 340. The event record 344 may comprise the Seq. ID 346 for the event record 344, the event ID 348 indicating the logical owner of the event record 344 to be the block 340, a block timestamp 349 of the block 340, and times 954, 964 received from the time servers 920, 930 in response to the query related to the block 340.

The second participating neighbor blockchain 400 is shown having generated a block 440 at a time after the block 240 was generated by the principal blockchain 200. The block 440 may be sent 440 to the principal blockchain 200. The receipt of the block 440 is communicated 910 to the time-based validation process 900. The time-based validation process 900 may query 926, 936 the first and second time servers 920, 930 as described above. If the difference between the block timestamp of the block 440 (analogous to the block timestamp 18 of FIG. 1) and the signed time certificates received from the time servers 920, 930 fall within the blockchain protocol variance limit, the event record 444 is made 442 in the event log 280 and comprises data associated to the block 440. The event record 444 may comprise the Seq. ID 446 for the event record 444, the event ID 448 indicating the logical owner of the event record 444 to be the block 340, a block timestamp 449 of the block 440, and times 956, 966 received from the time servers 920, 930 in response to the query related to the block 440.

Figure 7:
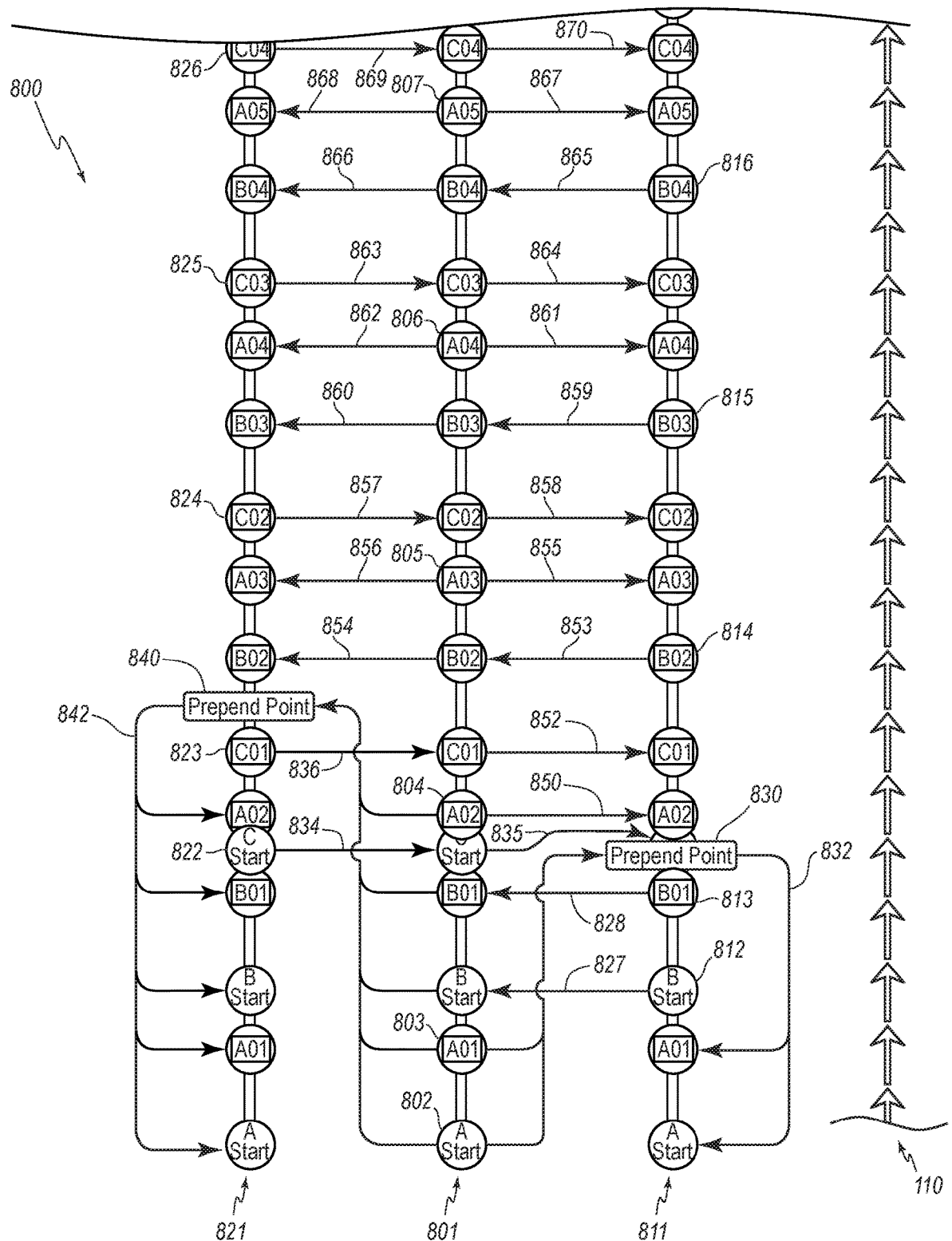
FIG. 7 is a flow diagram of a vector clock of a blockchain network, according to an embodiment of the present disclosure.

FIG. 7 is a flow diagram of a vector clock 800 of a blockchain network comprising three participating blockchains (not shown), analogous to the blockchain network 100 and participating blockchains 200, 300, 400 of FIG. 2, the vector clock 800 comprising event logs 801, 811, 821, according to an embodiment of the present disclosure. The event logs 801, 811, 821 are by way of example only, and not by way of limitation, and further may represent event logs of the participating blockchains 200, 300, 400 of the blockchain network 100 of FIG. 2. The event log 801 may represent the event log 280 of FIGS. 5-6, which may be analogous to an event log of the principal blockchain 200 of FIG. 2. Likewise, the event logs 811 and 821 may be analogous to event logs of, respectively, the first and second participating neighbor blockchains 300, 400 of FIGS. 2, 5-6. At least some of the communication described in conjunction with FIG. 7 may transpire in the same network as that of FIGS. 2, 5, which may be a multiplex network.

For the example of FIG. 7, a first blockchain associated with the event log 801 may be a first blockchain to start and to create a startup event record 802 in the event log 801. A first block may be generated and cause an event record 803. For the present example, a second blockchain, for the purposes of this example, analogous to the first participating neighbor blockchain of FIG. 2, may start after the blockchain of the event log 801, and may be associated to the event log 811. The event log 811 may comprise an event record 812 representing startup of the event log 811 (and its associated blockchain). The event record 812 of the event log 811 may be communicated 827 to and inserted into the event log 801. A first block of the blockchain associated to the event log 811 may be generated and create an event record 813. The event record 813 may be communicated 828 to and inserted into the event log 801. The event records of the first event log 811, for the example thus far, may comprise a startup event record 802 for the first blockchain, a first block event record 803 for the first blockchain, a startup event record (812) of the second blockchain, and a first block (813) of the second blockchain. The event records may be stored in the event log 801 in the order of occurrence and agnostic toward time.

A third blockchain, for the purposes of this example, analogous to the second participating neighbor blockchain of FIG. 2, may startup and generate a startup event record 822 in the event log 821. The startup event record 822 may be communicated 834 to and inserted into the event log 801. The third blockchain may generate a first block and a first block event record 823. The first block record event 823 may be communicated 836 to and inserted into the event log 801.

To the point described thus far, the event log 811 of the second blockchain comprises only the startup event record 812 and first block event record 813; and the event log 821 of the third blockchain comprises only the startup event record 822 and first block event record 823. At some point after the event log 811 starts, the event log 811 may reach a prepend point 830. The prepend point 830 may represent a request of the event log 811 to the event log 801 for all event records of the event log 801 preceding the receipt by the event log 801 of the startup event record 812 of the event log 811. Any event records, such as the startup event record 802 and first block event record of the event log 801 may be inserted 832 into the event log 811 so as to include the event records 802, 803 in the order within the event log 811 in which they were entered in the event log 801 and relative to all event records generated prior to the prepend point 830. In other words, after the actions associated with the prepend point 830, the event log 811 may comprise, in order, the startup event record 802 and first block event record 803 of the event log 801, and the startup event record 812 and first block event record 813 of the event log 811.

Similarly, the event log 821 may reach a prepend point 840. The event log 821 may request and receive all event records in the event log 801 and may insert 842 the event records received from the event log 801 such that the event log 821 may comprise a sequence of all event log event records commencing with the startup event record 802 of the event log 801, in the order in which the events represented by the event records 802, 803, 804, 812, 813, 822, 823 occurred.

As each blockchain of the blockchain network generates a new block, a subsequent block event record may be entered into the event log of the associated blockchain, and may be communicated to the event logs of the other blockchains in the blockchain network. By way of example without limitation, a subsequent block event record 804 may be inserted into the event log 801 in conjunction with the creation of a first subsequent block by the associated blockchain. The event record 804 may then be communicated 850 to the event log 811. In the present example, the event record 804 may be communicated to the event log 821 in conjunction with the event log 821 reaching the prepend point 840. The event log 821 may generate a subsequent block event record 823 and communicate 836 the event record 823 to the event log 801. The event record 823 may also be communicated 852 to the event log 811.

As the blockchain associated with the event log 801 generates new subsequent blocks, new subsequent block event records 805, 806, 807 (et seq. ad infinitum) are created in the event log 801 in the order of creation. These event records 805, 806, 807 are communicated 855, 861, 867 to the event log 811, and communicated 856, 862, 868 to the event log 821 for inclusion into each event log 811, 821 in the order in which they occurred. Likewise, the event log 811 generates new subsequent block event records 814, 815, 816 (et seq. ad infinitum) and communicates 853, 859, 865 each of these event records 814, 815, 816 to the event log 801 for inclusion in the event log 801 in the order in which the various events of both event logs 801, 811 occurred. The events 814, 815, 816 are also communicated (here, shown as being communicated 854, 860, 866) from the event log 801 to the event log 821 for inclusion in the event log 821 in the order in which each of the various events of the event logs 801, 811, 821 occurred. The event log 821 also generates new subsequent block event records 824, 825, 826 corresponding to subsequent new blocks of the blockchain associated with the event log 821, and communicates 857, 863, 869 the event records 824, 825, 826 to the event log 801. The event records 824, 825, 826 are also communicated (shown in FIG. 7 as communicated 858, 864, 870 by the event log 801) to the event log 811. Each event record 805 . . . , 815 . . . , 824 . . . is communicated when generated such that each event log 801, 811, 821 may comprise a comprehensive sequence of all block event records created by all blockchains within the blockchain network.

Figure 8:
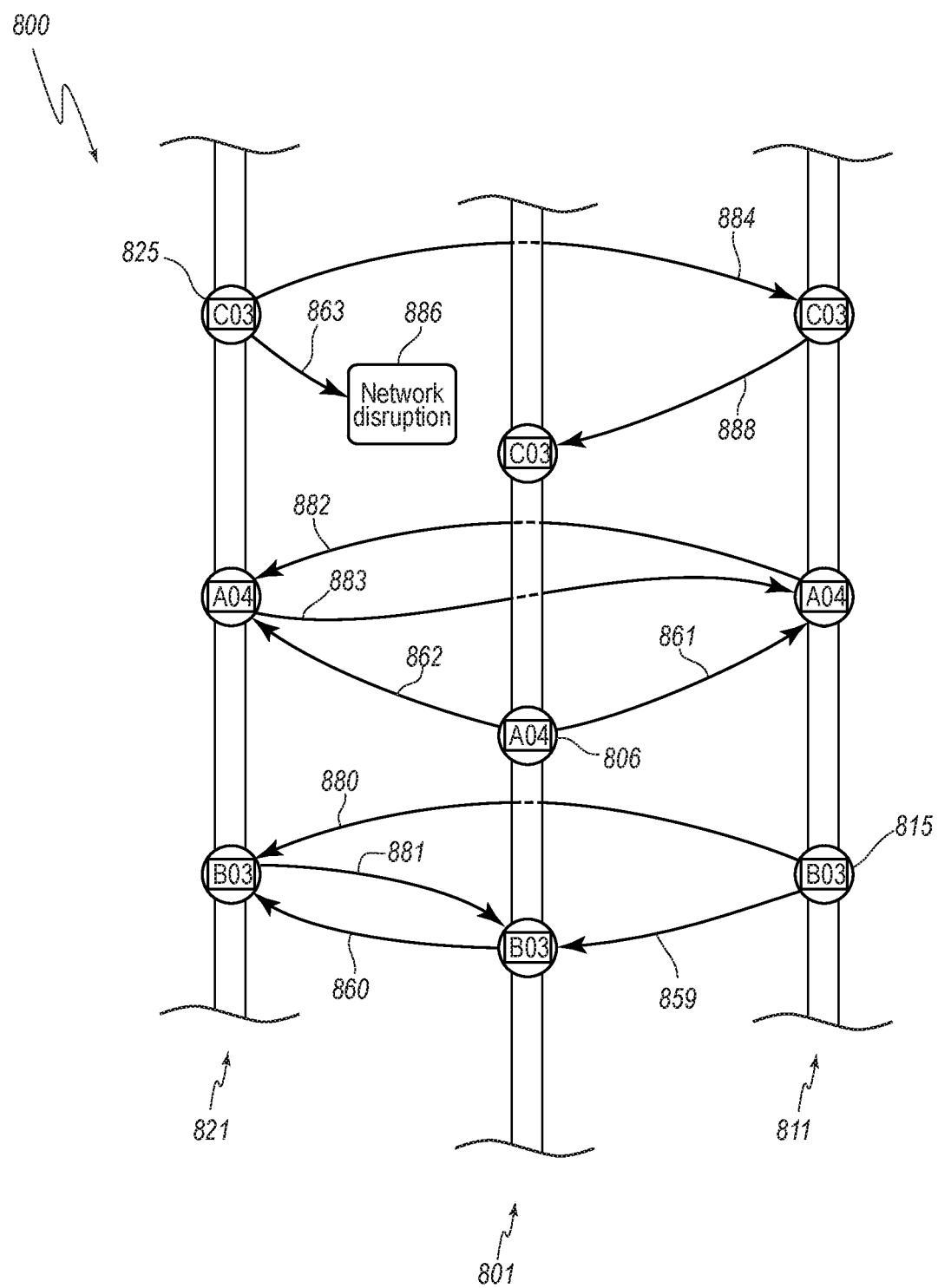
FIG. 8 is a detailed view of a portion of the vector clock of FIG. 7.

FIG. 8 is a detailed view of a portion of the vector clock 800 of FIG. 7. A portion of the event logs 801, 811, 821 is shown corresponding to the event records 806 (of the event log 801), 815 (of the event log 811), and 826 (of the event log 821). In FIG. 7, for ease of illustration, communication of the event record 815 is shown as proceeding from the event log 811 to the event log 801, and from the event log 801 to the event log 821. Similarly, the event record 825 of the event log 821 is shown as communicated from the event log 821 to the event log 801, and from the event log 801 to the event log 811. In addition, the multiple step communication from one event log to a second event log and from the second event log to a third event log, each event log 801, 811, 821 may communicate directly to each other event log 801, 811, 821. In FIG. 8, the event record 815 of the event log 811 is communicated 859 from the event log 811 to the event log 801, is communicated 860 from the event log 801 to the event log 821, and also communicated 880 from the event log 811 to the event log 821. Furthermore, when the event log 821 has received (via 880) the event record 815 from the event log 811, the event log 821 may communicate 881 the event record 815 to the event log 801.

The event record 806 of the event log 801 is communicated 861 from the event log 801 to the event log 811, is communicated 862 from the event log 801 to the event log 821, is communicated 882 from the event log 811 to the event log 821, and also communicated 883 from the event log 821 to the event log 811. The communication of each event record of each event log to each other event log ensures that each event log is able to record each event record of each event occurring in each blockchain participating in the blockchain network. Furthermore, communication of an event record from one event log to each other event log by each event log may allow each event record to be entered into each event log even in the presence of a network disruption. For example, the event log 821 may attempt to communicate 863 and 884 the event 825 to, respectively, the event log 801 and the event log 811. The event record 825 is shown successfully communicated 884 to the event log 811; however, a network disruption 886 has caused failure to communicate 863 the event record 825 to the event log 801. Because the event log 811 communicates all event records of the event log 811 to the event log 801, the event record 825 of the event log 811 may be communicated 888 to the event log 801 despite the network disruption 886 between the event log 821 and the event log 801.

Because each event record of each event log is communicated to each other event log by each event log of each blockchain participating in the blockchain network, an immutable record of block creation is generated for all participating blockchains. As here illustrated, an event record 825 has reached each event log 801, 811, 821 even though there is a network disruption 886 between the event logs 801, 811. This multiple communication (or multi-sourcing) of event records may also serve to prevent or identify a mis-ordered event record. Each event log, in addition to receiving individual event records from each other event log, may compare the ordering of events, either individually, or by periodically exchanging for comparison a partial or complete listing of events contained within the event log. In other words, the computer process generating each event log 801, 811, 821 may exchange, from time to time, a portion of the event log 801, 811, 821 generated in association with each particular blockchain of the blockchain network. Each computer process generating an event log 801, 811, 821 may compare the received event log to the event log of the particular associated blockchain. If a computer process generating an event log 801, 811, 821 identifies within the received event log an event record entered at an earlier position in the received event log than currently reflected in the computer process' own event log, the computer process may adjust its own event log to reflect the earlier ordering of the event.

By way of example, the network disruption 886 of FIG. 8, rather than preventing communication 863 of the event record 825 to the event log 801, merely results in a delay such that event record 825 is entered in the event log 801 after another block event record (for example, a new subsequent block 816 of the event log 811 communicated 865 to the event log 801 in FIG. 7). The event log 801 may thus reflect a partial order of events (referring to FIG. 7) as 815 (block B03), 806 (block A04), 816 (block B04), and 825 (block C03). When the computer process of the event log 801 receives the event logs 811, 821, the computer process of the event log 801 may identify the order of these particular events in the event logs 811, 821 as 815, 806, 825, 816, and may adjust the event log 801 to reflect the earliest ordering of the event 825. Similarly, if each event log 801, 811, 821 had the event 825 in a different order position, the exchange and comparison of event logs 801, 811, 821 will enable each event log 801, 811, 821 to adopt the earliest order sequence of the event 825. In this way, each event log 801, 811, 821 may reflect the earliest, in order of appearance, point at which each block of each associated blockchain was first generated. In other words, the vector clock 800 may allow each event log 801, 811, 821 to maintain an immutable record of the order of block generation of every block within each blockchain participating in the blockchain network. The immutable ordering of the vector clock enhances the degree of immutability or each block achieved through the mutual-merge mining of cross-merkelization.

Each event entry may further comprise an actionable item. An actionable item may represent a real-world physical action to be performed, or a logical computer-executable function, or both. In other words, a particular event entry may reference an associated block of one of the blockchains in the blockchain network, and may contain data, the receipt of which by one of the computing systems operating a blockchain of the blockchain network may indicate that a physical process or action be performed at, by, or under the direction of the entity operating the receiving computing system, or to execute a logical process or function within the receiving computing system (or a component of the receiving computing system), or both. By way of example without limitation, and referring to FIGS. 7-8, the computing system operating the event log 801 may generate, in addition to the block A04 (shown within the event record 806), the event record 806. The event record 806 may comprise, in addition to a reference to the block A04 of the blockchain associated to the event log 801 (such as the principal blockchain 200 of FIG. 2), an instruction actionable by the entity operating the computing system of the event log 811 to dispatch a particular cargo of goods, and a further instruction actionable by the entity operating the computing system of the event log 821 to remit a payment to the entity operating the computing system of the event log 811 upon receipt from the computing system of the event log 811 an event record (such as the event record 816 of FIG. 7) confirming that the cargo of goods has been dispatched.

Figure 9:
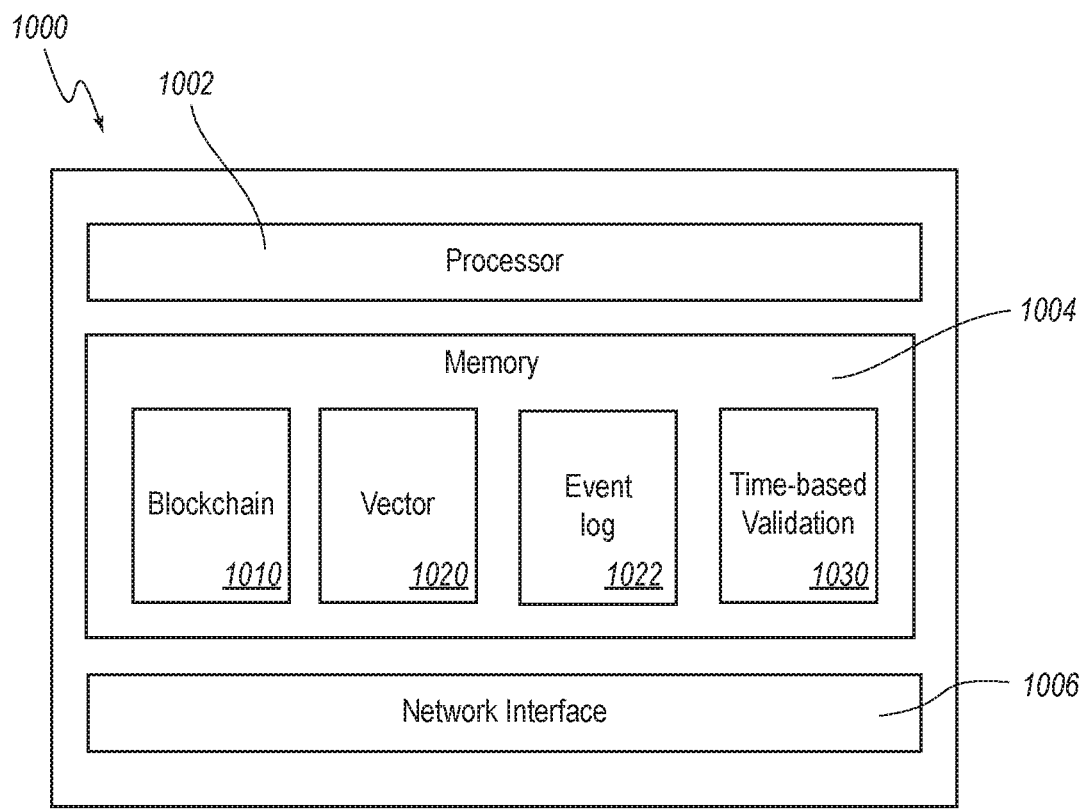
FIG. 9 is a diagram of a computing system providing immutable records, according to one embodiment of the present disclosure.

FIG. 9 is a diagram of a computing system 1000 providing immutable records, according to one embodiment of the present disclosure. The computing system 1000 may comprise one or more processors 1002, a memory 1004, a network interface 1006, a blockchain 1010, a vector 1020 of a vector clock, an event log 1022, and a time-based validation process 1030. Computing system 1000 may be analogous to computing system 1 of FIGS. 1 and 6 described above.

The vector 1020 may provide logging of events in the event log 1022 and may provide functionality for receiving other event logs from other computing systems implementing different blockchains, and then comparing the event log 1022 to the other event logs.

As can be appreciated, other configurations of computing devices are possible, including distributed computing systems comprising a plurality of processors and/or memories distributed over and interconnected via a communication network.

EXAMPLE EMBODIMENTS

The following are some example embodiments within the scope of the disclosure. In order to avoid complexity in providing the disclosure, not all of the examples listed below are separately and explicitly disclosed as having been contemplated herein as combinable with all of the others of the examples listed below and other embodiments disclosed hereinabove. Unless one of ordinary skill in the art would understand that these examples listed below (and the above disclosed embodiments) are not combinable, it is contemplated within the scope of the disclosure that such examples and embodiments are combinable.

Example 1

A principal computing system providing immutable record keeping (and/or an order of events and/or provable ordering of events), comprising: one or more computer-readable storage media to store a principal blockchain to store record data in a principal series of blocks that are chronologically linked, a most recent block of the principal series of blocks including a cryptographic hash (e.g. a block digest of the most recent block, a nonce for the cryptographic hash of the most recent block, a cryptographic hash of a sequentially prior block, a nonce for the cryptographic hash of the sequentially prior block, a target difficulty for the cryptographic hash, a timestamp, and a portion of the record data; one or more processors in electrical communication with the one or more computer-readable storage media and configured to generate the principal blockchain or otherwise implement a protocol of the principal blockchain, the one or more processors to: create a new block of the principal series of blocks to store new record data, the new block linked to the most recent block by including the cryptographic hash (e.g. a block digest) of the most recent block, and optionally the nonce for the cryptographic hash of the most recent block, a target difficulty for the cryptographic hash of the most recent block, and a timestamp, the new block becoming a new most recent block of the principal series of blocks; generate a new cryptographic hash (e.g., a new block digest) of the new block of the of the principal series of blocks using a new nonce and complying with the target difficulty for the cryptographic hash of the new block; store the new cryptographic hash and the new nonce in the new block; and transmit to a first neighbor computing system, over a communication network via a network interface, the new cryptographic hash of the new block and the new nonce for the cryptographic hash of the new block to cross-merkelize the principal blockchain with a first participating neighbor blockchain on the first neighbor computing system.

Example 2

The system of Example 1, wherein the cryptographic hash of each block of the principal blockchain is generated by a one-way secure hashing algorithm.

Example 3

The system of Example 1, wherein the cryptographic hash comprises a binary hash tree, wherein the cryptographic hash results from concatenation with a nonce to form an input string for a one-way cryptographic function, the output of which complies with a target difficulty that comprises a rule specifying a compliant cryptographic hash.

Example 4

The system of Example 3, wherein the rule indicates a particular collection of one or more binary values in specified positions of the compliant cryptographic hash.

Example 5

The system of Example 1, wherein the one or more processors are further to receive from the first neighbor computing system a cryptographic hash, a corresponding nonce, and a collection of cryptographic hashes of a most recent block of a first neighbor series of blocks.

Example 6

The system of Example 5, wherein the cryptographic hash of each block of the first participating neighbor blockchain is generated by a one-way secure hashing algorithm.

Example 7

The system of Example 5, wherein the collection of cryptographic hashes comprises at least a cryptographic hash of a most recent block of the principal blockchain.

Example 8

The system of Example 5, wherein the collection of cryptographic hashes comprises at least a cryptographic hash of a most recent block of a second participating neighbor blockchain.

Example 9

The system of Example 5, wherein the one or more processors are further to create a next block of the principal series of blocks, the next block linked to the new most recent block by including the new cryptographic hash (of the new most recent block) and the new nonce (for the cryptographic hash of the new most recent block), the next block also including the cryptographic hash (and the corresponding nonce) of the most recent block of the first neighbor series of blocks (of the first participating neighbor blockchain implemented on the first neighbor computing system).

Example 10

The system of Example 5, wherein the one or more processors are further to store a principal event log including an ordered listing of event records each corresponding to a transaction record of the record data stored in the principal series of blocks of the principal blockchain.

Example 11

The system of Example 10, wherein the one or more processors are further to: record to the principal event log an event record indicating creation of the new block; and record to the principal event log an event record corresponding to the most recent block of the first neighbor series of blocks of the first participating neighbor blockchain, upon receiving the cryptographic hash and the corresponding nonce of the most recent block of the first neighbor series of blocks of the first participating neighbor blockchain.

Example 12

The system of Example 10, wherein the one or more processors are further to: identify a transaction record of the record data as corresponding to an event; and record to the principal event log an event record corresponding to the event.

Example 13

The system of Example 1, wherein the one or more computer-readable storage media are further to store a principal event log including an ordered listing of event records each corresponding to a transaction record included in the record data of the principal blockchain, wherein the one or more processors are further to record to the principal event log an event record indicating creation of the new block.

Example 14

The system of Example 13, the one or more processors further to: receive (e.g., from first neighbor computing system over a communication network via a network interface) at least a portion of a first neighbor event log; compare the principal event log with the first neighbor event log; and ensure that an earliest appearance of each block is reflected in the principle event log based on the comparison.

Example 15

The system of Example 14, the one or more processors further to: re-order event entries of the principal event log based on the comparison and/or based on an earlier entry in one of the principal event log and the neighbor event log for each event record.

Example 16

The system of Example 1, wherein the first neighbor computing system is in electronic communication with the system and implements a first participating neighbor blockchain comprising a first neighbor series of blocks that are chronologically linked, a most recent block of the first neighbor series of blocks including a cryptographic hash (e.g., a block digest) of the most recent block, a nonce for the cryptographic hash of the most recent block, and a cryptographic hash of a sequentially prior block of the first neighbor series of blocks (and optionally a nonce for the cryptographic hash of the sequentially prior block of the first neighbor series of blocks).

Example 17

The system of Example 16, the most recent block of the first neighbor series of blocks further including the cryptographic hash of the most recent block of the first principle series of blocks and a nonce for the cryptographic hash of the most recent block of the first principle series of blocks to cross-merkelize the principal blockchain with the first participating neighbor blockchain.

Example 18

The system of Example 1, wherein the one or more processors are further to transmit to a second neighbor computing system (e.g., over a communication network via a network interface) the new cryptographic hash (of the new block) and the new nonce (for the cryptographic hash of the new block) to cross-merkelize the principal blockchain with a second participating neighbor blockchain on the second neighbor computing system.

Example 19

The system of Example 18, wherein the one or more processors are further to receive from the second neighbor computing system a cryptographic hash, a corresponding nonce, and a collection of cryptographic hashes of a most recent block of a second neighbor series of blocks of a second participating neighbor blockchain implemented on the second neighbor computing system.

Example 20

The system of Example 1, wherein the record data comprises a plurality of transaction records.

Example 21

A distributed electronic record system providing immutable record keeping (which may provide an immutable record of an order of events and/or which may provide provable ordering of events), comprising: a principal computing system implementing a principal blockchain to store record data in a principal series of blocks that are chronologically linked, wherein a most recent block of the principal series of blocks includes a cryptographic hash (e.g., block digest) of the most recent block of the principal series of blocks, a nonce for the cryptographic hash of the most recent block of the principal series of blocks, a cryptographic hash of a sequentially prior block of the principal series of blocks (and optionally a nonce for the cryptographic hash of the sequentially prior block of the principal series of blocks), and a portion of the record data; a first neighbor computing system in electronic communication with the principal computing system over a communication network, the first neighbor computing system implementing a first participating neighbor blockchain comprising a first neighbor series of blocks that are chronologically linked, wherein a most recent block of the first neighbor series of blocks includes a cryptographic hash of the most recent block of the first neighbor series of blocks, a nonce for the cryptographic hash of the most recent block of the first neighbor series of blocks, a cryptographic hash of a sequentially prior block of the first neighbor series of blocks (and optionally a nonce for the cryptographic hash of the sequentially prior block of the first neighbor series of blocks), wherein the principle computing system is to: create a new block of the principal series of blocks to store new record data, the new block linked to the most recent block of the principal series of blocks by inclusion of the cryptographic hash (e.g., a block digest) of the most recent block of the principal series of blocks (and optionally the nonce for the cryptographic hash of the most recent block of the principal series of blocks), the new block becoming a new most recent block of the principal series of blocks; generate a new cryptographic hash (e.g., a proof-of-work digest) of the new block of the of the principal series of blocks using a new nonce (and complying with the target difficulty for the cryptographic hash of the new block), the new cryptographic hash and the new nonce stored in the new block; and transmit to the first neighbor computing system (e.g., over a communication network via a network interface) the new cryptographic hash of the new block and the new nonce for the cryptographic hash of the new block to cross-merkelize the principal blockchain with the first participating neighbor blockchain.

Example 22

The system of Example 21, wherein the cryptographic hash of each block of the principal blockchain is generated by a one-way secure hashing algorithm, and wherein the cryptographic hash of each block of the first participating neighbor blockchain is generated by a one-way secure hashing algorithm.

Example 23

The system of Example 21, the most recent block of the first neighbor series of blocks further including the cryptographic hash of the most recent block of the principle series of blocks and the nonce for the cryptographic hash of the most recent block of the first principle series of blocks.

Example 24

The system of Example 21, the most recent block of the principle series of blocks further including the cryptographic hash of the most recent block of the first neighbor series of blocks and the nonce for the cryptographic hash of the most recent block of the first neighbor series of blocks.

Example 25

The system of Example 21, wherein the first neighbor computing system is further to transmit to the principle computing system the cryptographic hash and the corresponding nonce of the most recent block of the first neighbor series of blocks of the first participating neighbor blockchain implemented on the first neighbor computing system.

Example 26

The system of Example 21, wherein the principle computing system is further to receive from the first neighbor computing system a cryptographic hash and a corresponding nonce of the most recent block of the first neighbor series of blocks of the first participating neighbor blockchain implemented on the first neighbor computing system.

Example 27

The system of Example 21, wherein the first neighbor computing system is to: create a new neighbor block of the first neighbor series of blocks, the new neighbor block linked to the most recent block of the first neighbor series of blocks by inclusion of the cryptographic hash of the most recent block of the first neighbor series of blocks (and the nonce for the cryptographic hash of the most recent block of the first neighbor series of blocks), the new block becoming a new most recent block of the principal series of blocks; generate a new cryptographic hash of the new block of the of the first neighbor series of blocks using a new nonce and complying with the target difficulty for the cryptographic hash of the new block, the new cryptographic hash and the new nonce stored in the new neighbor block; and transmit to the principle computing system (e.g., over a communication network via a network interface) the new cryptographic hash of the new neighbor block and the new nonce for the cryptographic hash of the new neighbor block to cross-merkelize the first participating neighbor blockchain with the principal blockchain. The first neighbor computing system can further store in the new neighbor block the new cryptographic hash of the new block of the principle series of blocks] and the new nonce for the cryptographic hash of the new block of the principle series of blocks to cross-merkelize the principal blockchain with a first participating neighbor blockchain on the first neighbor computing system.

Example 28

The system of Example 21, further comprising: a second neighbor computing system in electronic communication with the principal computing system and/or the first neighbor computing system over a communication network, the second neighbor computing system implementing a second participating neighbor blockchain comprising a second neighbor series of blocks that are chronologically linked, wherein a most recent block of the second neighbor series of blocks includes a cryptographic hash of the most recent block of the second neighbor series of blocks, a nonce for the cryptographic hash of the most recent block of the second neighbor series of blocks, a cryptographic hash of a sequentially prior block of the second neighbor series of blocks (and optionally a nonce for the cryptographic hash of the sequentially prior block of the second neighbor series of blocks), wherein the principle computing system is further to transmit to the second neighbor computing system (e.g., over a communication network via a network interface) the new cryptographic hash of the new block and the new nonce for the cryptographic hash of the new block to cross-merkelize the principal blockchain with the second participating neighbor blockchain.

Example 29

The system of Example 28, wherein the first neighbor computing system is further to transmit to the second neighbor computing system the cryptographic hash and the corresponding nonce of the most recent block of the first neighbor series of blocks of the first participating neighbor blockchain implemented on the first neighbor computing system.

Example 30

The system of Example 28, wherein the principle computing system is further to receive from the second neighbor computing system a cryptographic hash and a corresponding nonce of the most recent block of the second neighbor series of blocks of the second participating neighbor blockchain implemented on the second neighbor computing system.

Example 31

The system of Example 28, wherein the second neighbor computing system is further to receive from the principle computing system a cryptographic hash and a corresponding nonce of the most recent block of the principle series of blocks of the first participating neighbor blockchain implemented on the principle computing system, and wherein the second neighbor computing system is further to receive from the first neighbor computing system a cryptographic hash and a corresponding nonce of the most recent block of the first neighbor series of blocks of the first participating neighbor blockchain implemented on the first neighbor computing system.

Example 32

A method of providing immutable record keeping (e.g., of transaction records) (and/or an immutable record of an order of events and/or provable ordering of events), comprising: establishing or otherwise implementing a principal blockchain on a principal computing system, the principal blockchain to store transaction records in a principal series of blocks that are stored on one or more computer-readable storage media of the principal computing system and that are chronologically linked, a most recent block of the principal series of blocks including a cryptographic hash (e.g., e.g., a proof-of-work (POW) digest) of the most recent block, a nonce for the cryptographic hash of the most recent block, a cryptographic hash of a sequentially prior block, and a portion of the transaction records; creating a new block of the principal series of blocks to store new transaction records, the new block linked to the most recent block by including the cryptographic hash (e.g., a block digest) of the most recent block (and optionally the nonce for the cryptographic hash of the most recent block), the new block becoming a new most recent block of the principal series of blocks; generating a new cryptographic hash (e.g., a new POW digest) of the new block of the of the principal series of blocks using a new nonce (and complying with the target difficulty for the cryptographic hash of the new block); storing the new cryptographic hash and the new nonce in the new block; and transmitting to a first neighbor computing system (e.g., over a communication network via a network interface) the new cryptographic hash of the new block and the new nonce for the cryptographic hash of the new block to cross-merkelize the principal blockchain with a first participating neighbor blockchain on the first neighbor computing system.

Example 33

A system (e.g., a principal computing) providing immutable record keeping (e.g., of transaction records and/or of an order of events), or otherwise providing provable ordering of events, comprising: one or more computer-readable storage media to store a principal blockchain to store transaction records in a principal series of blocks that are chronologically linked, a most recent block of the principal series of blocks including a proof-of-work (POW) digest (which is generated by cryptographically hashing a block digest (of the most recent block) with a nonce to achieve (comply with) a target difficulty, a block digest of a sequentially prior block, and a portion of the transaction records; one or more processors in electrical communication with the one or more computer-readable storage media and configured to implement a protocol of the principal blockchain, the one or more processors to: create a new block of the principal series of blocks to store new transaction records, the new block linked to the most recent block by including a cryptographic hash (e.g., a block digest) of the most recent block, the new block to become a new most recent block of the principal series of blocks; generate a records digest (e.g., a merkel root) of the new transaction records by cryptographically hashing the new transaction records; generate a block digest of the new block by cryptographically hashing the records digest with a new nonce; generate a new POW digest of the new block by cryptographically hashing the block digest of the new block with the new nonce to achieve (or otherwise comply with) a target difficulty; store the new POW digest, the new nonce, and the records digest of the new block in the new block; and transmit to a first neighbor computing system (e.g., over a communication network via a network interface) a header of the new block, the header comprising the new POW digest of the new block, the new nonce, and the records digest to cross-merkelize the principal blockchain with a first participating neighbor blockchain on the first neighbor computing system.

Example 34

The system of Example 33, wherein the one or more processors are further to receive from the first neighbor computing system (e.g., over a communication network via a network interface) a header of a most recent first neighbor block of the first participating neighbor blockchain on the first neighbor computing system, the header comprising a POW digest of a most recent first neighbor block of a first participating neighbor blockchain on the first neighbor computing system, a nonce of the most recent first neighbor block, and a records digest of the most recent first neighbor block to cross-merkelize the first participating neighbor blockchain with the principal blockchain.

Example 35

The system of Example 34, wherein the one or more processors are further to create a next block of the principal series of blocks, the next block linked to the new most recent block by including the new POW digest of the new block, the new nonce, and the records digest, the POW digest of the most recent first neighbor block, the nonce of the most recent first neighbor block, and a records digest of the most recent first neighbor block.

Example 36

The system of Example 33, wherein the one or more processors are further to maintain (e.g., in a computer readable storage medium) a principal event log including an ordered listing of event records each corresponding to a transaction record of the transaction records stored in the principal series of blocks of the principal blockchain.

Example 37

The system of Example 36, wherein the one or more processors are further to record to the principal event log an event record indicating creation of the new block.

Example 38

The system of Example 36, the one or more processors further to: receive, from the first neighbor computing system (e.g., over a communication network via a network interface), at least a portion of a first neighbor event log; compare the principal event log with the first neighbor event log; and ensure that an earliest appearance of each event record (e.g., an event record of a new block) is reflected in the principle event log based on the comparison.

Example 39

The system of Example 38, he one or more processors further to: re-order event entries of the principal event log based on the comparison and/or based on an earlier entry in one of the principal event log and the neighbor event log for each event record.

Example 40

A method of providing immutable record keeping (e.g., of transaction records and/or of an order of events), or otherwise providing provable ordering of events, comprising: establishing or otherwise implementing (a protocol of) a principal blockchain on a principal computing system, the principal blockchain to store transaction records in a principal series of blocks that are stored on one or more computer-readable storage media of the principal computing system and that are chronologically linked, a most recent block of the principal series of blocks including a proof-of-work (POW) digest (which is generated by cryptographically hashing a block digest (of the most recent block) with a nonce to achieve (or otherwise comply with) a target difficulty, a block digest of a sequentially prior block, and a portion of the transaction records; creating a new block of the principal series of blocks to store new transaction records, the new block linked to the most recent block by including a cryptographic hash (e.g., a block digest) of the most recent block, the new block becoming a new most recent block of the principal series of blocks; generating a new records digest (merkel root) of the new transaction records by cryptographically hashing the new transaction records; generating a new block digest of the new block by cryptographically hashing the new records digest with a new nonce; generating a new POW digest of the new block by cryptographically hashing a block digest of the new block with a new nonce to achieve (or otherwise comply with) a target difficulty; storing the new POW digest, the new nonce, and the new records digest in the new block; and transmitting to a first neighbor computing system (e.g., over a communication network via a network interface) a header of the new block, the header comprising the new POW digest of the new block, the new nonce, and the new records digest to cross-merkelize the principal blockchain with a first participating neighbor blockchain on the first neighbor computing system.

Example 41

A distributed electronic record system providing immutable record keeping, comprising: a principal blockchain to store record data in a principal series of blocks that are chronologically linked, wherein a most recent block of the principal series of blocks includes a cryptographic hash of the most recent block, a nonce for the cryptographic hash of the most recent block, a cryptographic hash of a sequentially prior block, and a portion of the record data; a first participating neighbor blockchain comprising a first neighbor series of blocks that are chronologically linked, wherein a most recent block of the first neighbor series of blocks includes a cryptographic hash of the most recent block of the first neighbor series of blocks, a nonce for the cryptographic hash of the most recent block of the first neighbor series of blocks, and a cryptographic hash of a sequentially prior block of the first neighbor series of blocks, wherein the principle blockchain is to: create a new block of the principal series of blocks to store new record data, the new block linked to the most recent block of the principal series of blocks by inclusion of the cryptographic hash of the most recent block of the principal series of blocks, the new block becoming a new most recent block of the principal series of blocks; generate a new cryptographic hash of the new block of the of the principal series of blocks using a new nonce, the new cryptographic hash and the new nonce stored in the new block; and transmit to the first participating neighbor blockchain the new cryptographic hash and the new nonce.

Example 42

A system providing immutable record keeping, comprising: a principal blockchain to store transaction records in a principal series of blocks that are chronologically linked, wherein a most recent block of the principal series of blocks includes a proof-of-work (POW) digest, a block digest of a sequentially prior block, and a portion of the transaction records; a first participating neighbor blockchain comprising a first neighbor series of blocks that are chronologically linked, wherein a most recent block of the first neighbor series of blocks includes a proof-of-work (POW) digest of the most recent block of the first neighbor series of blocks and a block digest of a sequentially prior block of the first neighbor series of blocks; wherein the principle blockchain is to: create a new block of the principal series of blocks to store new transaction records, the new block linked to the most recent block by including a block digest of the most recent block, the new block to become a new most recent block of the principal series of blocks; generate a records digest (merkel root) of the new transaction records; generate a new POW digest of the new block by cryptographically hashing a block digest of the new block with a new nonce; store the new POW digest, the new nonce, and the records digest of the new block in the new block; and transmit to the first participating neighbor blockchain the new POW digest, the new nonce, and the records digest.

Example 43

The system of Example 41, wherein the principle blockchain is further to receive from the first participating neighbor blockchain a POW digest of a most recent first neighbor block of the first participating neighbor blockchain, a nonce of the most recent first neighbor block, and a records digest of the most recent first neighbor block.

Example 44

The system of Example 43, wherein the principle blockchain is further to create a next block of the principal series of blocks, the next block linked to the new most recent block by including the block digest of the new block, the new nonce of the new block, and the records digest of the new block, and wherein a next block including the POW digest of the most recent first neighbor block, the nonce of the most recent first neighbor block, and the records digest of the most recent first neighbor block.

Example 45

The system of Example 41, further comprising a vector clock comprising: a principal event log including an ordered listing of event records each corresponding to a transaction record of the transaction records stored in the principal series of blocks of the principal blockchain; and a first participating neighbor event log including an ordered listing of event records each corresponding to a transaction record of the transaction records stored in the first neighbor series of blocks of the first participating neighbor blockchain, wherein the vector clock compares the principal event log with the first neighbor event log and ensures an earliest appearance of each event record is reflected in the principle event log.

Example 46

The system of Example 45, wherein the vector clock is configured to re-order event records of the principal event log based on the comparison.

Example 47

The system of Example 45, wherein the one or more processors are further to record (e.g., to the principal event log) an event record indicating creation of the new block.

Example 48

A system providing an immutable record to enable provable ordering of events, comprising: a principal blockchain (on a principal computing system) to store transaction records in a principal series of blocks that are chronologically linked, wherein a most recent block of the principal series of blocks includes a proof-of-work (POW) digest, a block digest of a sequentially prior block, and a portion of the transaction records; a principal event log (on the principal computing system) including an ordered listing of event records each corresponding to a transaction record of the transaction records stored in the principal series of blocks of the principal blockchain; a first participating neighbor blockchain (on a first participating neighbor computing system) comprising a first neighbor series of blocks that are chronologically linked, wherein a most recent block of the first neighbor series of blocks includes a proof-of-work (POW) digest of the most recent block of the first neighbor series of blocks and a block digest of a sequentially prior block of the first neighbor series of blocks; a first participating neighbor event log (on the first participating neighbor computing system) including an ordered listing of event records each corresponding to a transaction record of the transaction records stored in the first neighbor series of blocks of the first participating neighbor blockchain; and a vector clock to compares the principal event log with the first neighbor event log and ensures an earliest appearance of each event record is reflected in the principle event log, wherein the principle blockchain is to: create a new block of the principal series of blocks to store new transaction records, the new block linked to the most recent block by including a block digest of the most recent block, the new block to become a new most recent block of the principal series of blocks; generate a records digest (merkel root) of the new transaction records; generate a new POW digest of the new block by cryptographically hashing a block digest of the new block with a new nonce; store the new POW digest, the new nonce, and the records digest of the new block in the new block; record in the principal event log an event record corresponding to the creation of the new block; and transmit to the first participating neighbor blockchain the new POW digest, the new nonce, and the records digest.

Example 49

A principal computing system providing an immutable record to enable provable ordering of events, comprising: one or more computer-readable storage media to store: a principal blockchain to store transaction records in a principal series of blocks that are chronologically linked, a most recent block of the principal series of blocks including a proof-of-work (POW) digest (which is generated by cryptographically hashing a block digest (of the most recent block) with a nonce to achieve (comply with) a target difficulty, a block digest of a sequentially prior block, and a portion of the transaction records; and a principal event log including an ordered listing of event records each corresponding to a transaction record of the transaction records stored in the principal series of blocks of the principal blockchain; and one or more processors in electrical communication with the one or more computer-readable storage media and configured to implement a protocol of the principal blockchain, the one or more processors to: receive from a first neighbor computing system a POW digest of a most recent block of a first neighbor series of blocks of a first participating neighbor blockchain implemented on the first neighbor computing system, a corresponding nonce of the POW digest of the most recent block of the first neighbor series of blocks, and a records digest of the most recent block of the first neighbor series of blocks; create a new block of the principal series of blocks to store new transaction records including the POW digest of the most recent block of the first neighbor series of blocks, the corresponding nonce of the POW digest of the most recent block of the first neighbor series of blocks, and the records digest of the most recent block of the first neighbor series of blocks, wherein the new block is linked to the most recent block by including a cryptographic hash (e.g., a block digest) of the most recent block, the new block to become a new most recent block of the principal series of blocks; generate a records digest (e.g., a merkel root) of the new transaction records by cryptographically hashing the new transaction records, including the POW digest of the most recent block of the first neighbor series of blocks, the corresponding nonce of the POW digest of the most recent block of the first neighbor series of blocks, and the records digest of the most recent block of the first neighbor series of blocks; generate a block digest of the new block by cryptographically hashing . . . the records digest with a new nonce; generate a new POW digest of the new block by cryptographically hashing a block digest of the new block with the new nonce to achieve (comply with) a target difficulty; store the new POW digest, the new nonce, and the records digest of the new block in the new block; record in the principal event log an event record corresponding to the creation of the new block; compare the principal event log with a first neighbor event log and ensure an earliest appearance of each event record is reflected in the principle event log, the first neighbor event log including an ordered listing of event records each corresponding to a transaction record of the transaction records stored in the first neighbor series of blocks of the first participating neighbor blockchain implemented on the first neighbor computing system; and transmit to a first neighbor computing system (e.g., over a communication network via a network interface) the new POW digest of the new block, the new nonce, and the records digest to cross-merkelize the principal blockchain with a first participating neighbor blockchain on the first neighbor computing system. The described features, operations, or characteristics may be arranged and designed in a wide variety of different configurations and/or combined in any suitable manner in one or more embodiments. Thus, the detailed description of the embodiments of the systems and methods is not intended to limit the scope of the disclosure, as claimed, but is merely representative of possible embodiments of the disclosure. In addition, it will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments may also be provided as a computer program product including a computer-readable storage medium having stored instructions thereon that may be used to program a computer (or other electronic device) to perform processes described herein. The computer-readable storage medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of medium/machine-readable medium suitable for storing electronic instructions.

As used herein, a software module or component may include any type of computer instruction or computer executable code located within a memory device and/or computer-readable storage medium. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

The foregoing specification has been described with reference to various embodiments, including the best mode. However, those skilled in the art appreciate that various modifications and changes can be made without departing from the scope of the present disclosure and the underlying principles of the invention. Accordingly, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection.

Recitation in the claims of the term "first" with respect to a feature or element does not necessarily imply the existence of a second or additional such feature or element. Principles of the present disclosure may be reflected in a computer program product on a tangible computer-readable storage medium having computer-readable program code means embodied in the storage medium. Any suitable computer-readable storage medium may be utilized, including magnetic storage devices (hard disks, floppy disks, and the like), optical storage devices (CD-ROMs, DVDs, Blu-Ray discs, and the like), flash memory, and/or the like. These computer program instructions may be loaded onto a general purpose computer, special purpose computer, or other programmable data processing apparatus to produce a machine, such that the instructions that execute on the computer or other programmable data processing apparatus create means for implementing the functions specified. These computer program instructions may also be stored in a computer-readable memory that can direct a computer or other programmable data processing apparatus to function in a particular manner, such that the instructions stored in the computer-readable memory produce an article of manufacture including instruction means which implement the function specified. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified.

Principles of the present disclosure may be reflected in a computer program implemented as one or more software modules or components. As used herein, a software module or component (e.g., engine, system, subsystem) may include any type of computer instruction or computer-executable code located within a memory device and/or computer-readable storage medium. A software module may, for instance, comprise one or more physical or logical blocks of computer instructions, which may be organized as a routine, a program, an object, a component, a data structure, etc., that perform one or more tasks or implement particular data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Suitable software to assist in implementing the invention is readily provided by those of skill in the pertinent art(s) using the teachings presented here and programming languages and tools, such as Java, Pascal, C++, C, database languages, APIs, SDKs, assembly, firmware, microcode, and/or other languages and tools.

Embodiments as disclosed herein may be computer-implemented in whole or in part on a digital computer. The digital computer includes a processor performing the required computations. The computer further includes a memory in electronic communication with the processor to store a computer operating system. The computer operating systems may include, but are not limited to, MS-DOS, Windows, Linux, Unix, AIX, CLIX, QNX, OS/2, and Apple. Alternatively, it is expected that future embodiments will be adapted to execute on other future operating systems.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Various operational steps, as well as components for carrying out operational steps, may be implemented in alternate ways depending upon the particular application or in consideration of any number of cost functions associated with the operation of the system, e.g., one or more of the steps may be deleted, modified, or combined with other steps.

While the principles of this disclosure have been shown in various embodiments, many modifications of structure, arrangements, proportions, the elements, materials and components, used in practice, which are particularly adapted for a specific environment and operating requirements, may be used without departing from the principles and scope of this disclosure. These and other changes or modifications are intended to be included within the scope of the present disclosure.

The scope of the present invention should, therefore, be determined only by the following claims.

The invention claimed is:

1. A system providing immutable record keeping, comprising:
one or more non-transitory computer-readable storage media to store a principal blockchain to store record data in a principal series of blocks that are chronologically linked, a most recent block of the principal series of blocks including a cryptographic hash of the most recent block, a nonce for the cryptographic hash of the most recent block, a cryptographic hash of a sequentially prior block, and a portion of the record data;
one or more processors in electrical communication with the one or more non-transitory computer-readable storage media and configured to implement the principal blockchain, the one or more processors to:
create a new block of the principal series of blocks to store new record data, the new block linked to the most recent block by including the cryptographic hash of the most recent block, the new block becoming a new most recent block of the principal series of blocks;
generate a new cryptographic hash of the new block using a new nonce;
store the new cryptographic hash and the new nonce in the new block; and
transmit to a first neighbor computing system the new cryptographic hash and the new nonce.

2. The system of claim 1, wherein the one or more processors are further to receive from the first neighbor computing system a cryptographic hash, a corresponding nonce, and a collection of cryptographic hashes of a most recent block of a first neighbor series of blocks.

3. The system of claim 2, wherein the one or more processors are further to create a next block of the principal series of blocks, the next block linked to the new most recent block by including the new cryptographic hash and the new nonce, the next block also including the cryptographic hash of the most recent block of the first neighbor series of blocks.

4. The system of claim 2, wherein the one or more processors are further to store a principal event log including an ordered listing of event records each corresponding to a transaction record of the record data stored in the principal series of blocks of the principal blockchain.

5. The system of claim 1, wherein the one or more non-transitory computer-readable storage media are further to store a principal event log including an ordered listing of event records each corresponding to a transaction record included in the record data of the principal blockchain,
wherein the one or more processors are further to record to the principal event log an event record indicating creation of the new block.

6. The system of claim 5, the one or more processors further to:
receive, from first neighbor computing system, at least a portion of a first neighbor event log;
compare the principal event log with the first neighbor event log; and
ensure that an earliest appearance of each event record is reflected in the principle event log based on the comparison.

7. The system of claim 1, wherein the first neighbor computing system is in electronic communication with the system and implements a first participating neighbor blockchain comprising a first neighbor series of blocks that are chronologically linked, a most recent block of the first neighbor series of blocks including a cryptographic hash of the most recent block, a nonce for the cryptographic hash of the most recent block, and a cryptographic hash of a sequentially prior block of the first neighbor series of blocks.

8. The system of claim 1, wherein the one or more processors are further to transmit to a second neighbor computing system the new cryptographic hash and the new nonce.

9. The system of claim 8, wherein the one or more processors are further to receive from the second neighbor computing system a cryptographic hash, a corresponding nonce, and a collection of cryptographic hashes of a most recent block of a second neighbor series of blocks of a second participating neighbor blockchain implemented on the second neighbor computing system.

10. The system of claim 1, wherein the record data comprises a plurality of transaction records.

11. A distributed electronic record system providing immutable record keeping, comprising:
a principal computing system implementing a principal blockchain to store record data in a principal series of blocks that are chronologically linked, wherein a most recent block of the principal series of blocks includes a cryptographic hash of the most recent block, a nonce for the cryptographic hash of the most recent block, a cryptographic hash of a sequentially prior block, and a portion of the record data;
a first neighbor computing system in electronic communication with the principal computing system over a communication network, the first neighbor computing system implementing a first participating neighbor blockchain comprising a first neighbor series of blocks that are chronologically linked, wherein a most recent block of the first neighbor series of blocks includes a cryptographic hash of the most recent block of the first neighbor series of blocks, a nonce for the cryptographic hash of the most recent block of the first neighbor series of blocks, and a cryptographic hash of a sequentially prior block of the first neighbor series of blocks,
wherein the principle computing system is to:
create a new block of the principal series of blocks to store new record data, the new block linked to the most recent block of the principal series of blocks by inclusion of the cryptographic hash of the most recent block of the principal series of blocks, the new block becoming a new most recent block of the principal series of blocks;
generate a new cryptographic hash of the new block of the of the principal series of blocks using a new nonce, the new cryptographic hash and the new nonce stored in the new block; and
transmit to the first neighbor computing system the new cryptographic hash and the new nonce.

12. The system of claim 11, the most recent block of the first neighbor series of blocks further including the cryptographic hash of the most recent block of the principle series of blocks and the nonce for the cryptographic hash of the most recent block of the first principle series of blocks.

13. The system of claim 11, the most recent block of the principle series of blocks further including the cryptographic hash of the most recent block of the first neighbor series of blocks and the nonce for the cryptographic hash of the most recent block of the first neighbor series of blocks.

14. The system of claim 11, wherein the first neighbor computing system is further to transmit to the principle computing system the cryptographic hash and the corresponding nonce of the most recent block of the first neighbor series of blocks of the first participating neighbor blockchain implemented on the first neighbor computing system.

15. The system of claim 11, wherein the first neighbor computing system is to:
create a new neighbor block of the first neighbor series of blocks, the new neighbor block linked to the most recent block of the first neighbor series of blocks by inclusion of the cryptographic hash of the most recent block of the first neighbor series of blocks, the new block becoming a new most recent block of the principal series of blocks;
generate a new cryptographic hash of the new block of the of the first neighbor series of blocks using a new nonce, the new cryptographic hash and the new nonce stored in the new neighbor block; and
transmit to the principle computing system the new cryptographic hash and the new nonce.

16. The system of claim 11, further comprising:
a second neighbor computing system in electronic communication with the principal computing system and the first neighbor computing system over a communication network, the second neighbor computing system implementing a second participating neighbor blockchain comprising a second neighbor series of blocks that are chronologically linked, wherein a most recent block of the second neighbor series of blocks includes a cryptographic hash of the most recent block of the second neighbor series of blocks, a nonce for the cryptographic hash of the most recent block of the second neighbor series of blocks, a cryptographic hash of a sequentially prior block of the second neighbor series of blocks,
wherein the principle computing system is further to transmit to the second neighbor computing system the new cryptographic hash and the new nonce.

17. A method of providing immutable record keeping, comprising:
implementing a principal blockchain on a principal computing system, the principal blockchain to store transaction records in a principal series of blocks that are chronologically linked, a most recent block of the principal series of blocks including a cryptographic hash of the most recent block, a nonce for the cryptographic hash of the most recent block, a cryptographic hash of a sequentially prior block, and a portion of the transaction records;

creating a new block of the principal series of blocks to store new transaction records, the new block linked to the most recent block by including the cryptographic hash of the most recent block, the new block becoming a new most recent block of the principal series of blocks;

generating a new cryptographic hash of the new block using a new nonce;

storing the new cryptographic hash and the new nonce in the new block; and transmitting to a first neighbor computing system the new cryptographic hash and the new nonce.

18. The method of claim 17, further comprising:
receiving from the first neighbor computing system a cryptographic hash, a corresponding nonce, and a collection of cryptographic hashes of a most recent block of a first neighbor series of blocks.

19. The method of claim 18, further comprising:
creating a next block of the principal series of blocks, the next block linked to the new most recent block by including the new cryptographic hash and the new nonce, the next block also including the cryptographic hash of the most recent block of the first neighbor series of blocks.

20. The method of claim 17, further comprising:
recording to a principal event log an event record indicating creation of the new block, wherein the principal event log includes an ordered listing of event records each corresponding to a transaction record of the principal blockchain.

21. A system providing immutable record keeping, comprising:
one or more non-transitory computer-readable storage media to store a principal blockchain to store transaction records in a principal series of blocks that are chronologically linked, a most recent block of the principal series of blocks including a proof-of-work (POW) digest, a block digest of a sequentially prior block, and a portion of the transaction records;

one or more processors in electrical communication with the one or more non-transitory computer-readable storage media and configured to implement the principal blockchain, the one or more processors to:

create a new block of the principal series of blocks to store new transaction records, the new block linked to the most recent block by including a cryptographic hash of the most recent block, the new block to become a new most recent block of the principal series of blocks;

generate a records digest (merkel root) of the new transaction records;

generate a new POW digest of the new block by cryptographically hashing a block digest of the new block with a new nonce;

store the new POW digest, the new nonce, and the records digest of the new block in the new block; and transmit to a first neighbor computing system the new POW digest, the new nonce, and the records digest.

22. The system of claim 21, wherein the one or more processors are further to receive from the first neighbor computing system a POW digest of a most recent first neighbor block of a first participating neighbor blockchain on the first neighbor computing system, a nonce of the most recent first neighbor block, and a records digest of the most recent first neighbor block.

23. The system of claim 22, wherein the one or more processors are further to create a next block of the principal series of blocks, the next block linked to the new most recent block by including the new POW digest, the new nonce, and the records digest, the POW digest of the most recent first neighbor block, the nonce of the most recent first neighbor block, and a records digest of the most recent first neighbor block.

24. The system of claim 21, wherein the one or more processors are further to maintain a principal event log including an ordered listing of event records each corresponding to a transaction record of the transaction records stored in the principal series of blocks of the principal blockchain.

25. The system of claim 24, wherein the one or more processors are further to record to the principal event log an event record indicating creation of the new block.

26. The system of claim 24, the one or more processors further to:
receive, from the first neighbor computing system, at least a portion of a first neighbor event log;
compare the principal event log with the first neighbor event log; and
re-order event entries of the principal event log based on the comparison.

* * * * *

UNITED STATES PATENT AND TRADEMARK OFFICE
CERTIFICATE OF CORRECTION

PATENT NO. : 10,803,022 B2
APPLICATION NO. : 16/127029
DATED : October 13, 2020
INVENTOR(S) : Taulant Ramabaja It is certified that error appears in the above-identified patent and that said Letters Patent is hereby corrected as shown below:

In the Claims

Column 39, Line 16 Claim 6 reads, "receive, from first neighbor computing system, at least a" which should read "from the first neighbor computing system, at least a"

Column 39, Line 21 Claim 6 reads, "reflected in the principle event log based on the com-" which should read "reflected in the principal event log based on the com-"

Column 40, Line 1 Claim 11 reads, "wherein the principle computing system is to:" which should read "wherein the principal computing system is to:"

Column 40, Line 10 Claim 11 reads, "the of the principal series of blocks using a new" which should read "the principal series of blocks using a new"

Column 40, Line 17 Claim 12 reads, "graphic hash of the most recent block of the principle series" which should read "graphic hash of the most recent block of the principal series"

Column 40, Line 19 Claim 12 reads, "most recent block of the first principle series of blocks" which should read "most recent block of the first principal series of blocks"

Column 40, Line 21 Claim 13 reads, "principle series of blocks further including the cryptographic" which should read "principal series of blocks further including the cryptographic"

Column 40, Line 26 Claim 14 reads, "computing system is further to transmit to the principle" which should read "computing system is further to transmit to the principal"

Column 40, Line 40 Claim 15 reads, "of the first neighbor series of blocks using a new nonce," which should read "first neighbor series of blocks using a new nonce,"

Signed and Sealed this
Fifteenth Day of February, 2022

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,803,022 B2

Column 40, Line 43 Claim 15 reads, "transmit to the principle computing system the new cryp-" which should read "transmit to the principal computing system the new cryp-"

Column 40, Line 60 Claim 16 reads, "wherein the principle computing system is further to" which should read "wherein the principal computing system is further to"